United States Patent
Perez Ramirez et al.

(10) Patent No.: US 11,324,168 B2
(45) Date of Patent: May 10, 2022

(54) FEEDERHOUSE GEARBOXES WITH REVERSER WORM DRIVES AND COMBINE HARVESTERS EQUIPPED WITH THE SAME

(71) Applicant: Deere & Company, Moline, IL (US)

(72) Inventors: Javier Jose Perez Ramirez, Bettendorf, IA (US); Prafulla S. Badhe, Chinchwad (IN); Pedro Gonzalez-Mohino, Boadilla del Monte (ES); Daniel Vergara Martinez, Coslada (ES); Paul D. Marvin, DeWitt, IA (US)

(73) Assignee: DEERE & COMPANY, Moline, IL (US)

( * ) Notice: Subject to any disclaimer, the term of this patent is extended or adjusted under 35 U.S.C. 154(b) by 519 days.

(21) Appl. No.: 16/381,663

(22) Filed: Apr. 11, 2019

(65) Prior Publication Data

US 2020/0323141 A1     Oct. 15, 2020

(51) Int. Cl.
| | |
|---|---|
| *A01D 69/06* | (2006.01) |
| *A01D 41/127* | (2006.01) |
| *A01D 41/14* | (2006.01) |
| *A01D 75/18* | (2006.01) |

(52) U.S. Cl.
CPC .......... *A01D 69/06* (2013.01); *A01D 41/1274* (2013.01); *A01D 41/142* (2013.01); *A01D 75/187* (2013.01)

(58) Field of Classification Search
CPC .. A01D 69/06; A01D 41/1274; A01D 41/142; A01D 41/16
See application file for complete search history.

(56) References Cited

U.S. PATENT DOCUMENTS

| | | | |
|---|---|---|---|
| RE32,599 E | * | 2/1988 | Musser ................ A01D 41/142 56/10.8 |
| 6,722,112 B2 | | 4/2004 | Pierce et al. |
| 6,810,649 B2 | | 11/2004 | Kempf |
| (Continued) | | | |

FOREIGN PATENT DOCUMENTS

| | | | | |
|---|---|---|---|---|
| CN | 103858608 A | | 6/2014 | |
| DE | 102020204477 A1 | * | 10/2020 | ......... A01D 41/1274 |

*Primary Examiner* — Thomas B Will
*Assistant Examiner* — Joan D Misa
(74) *Attorney, Agent, or Firm* — Klintworth & Rozenblat IP LLP

(57) ABSTRACT

Feederhouse gearboxes are provided for installation on combine harvesters. In embodiments, the feederhouse gearbox includes a gearbox housing, an output shaft rotatable about an output axis, and a primary drive input. The primary drive input is mechanically linked to an engine of the combine harvester when the feederhouse gearbox is installed thereon. A reverser drive input is mechanically linked to a reverser motor of the combine harvester when the feederhouse gearbox is installed on the combine harvester. The feederhouse gearbox further includes a selector mechanism within the gearbox housing and movable between a primary drive position and a reverser drive position, a primary gear train transmitting rotation from the primary drive input to the output shaft when the selector mechanism is in the primary drive position, and a reverser worm drive transmitting rotation from the reverser drive input to the output shaft when the selector mechanism is in the reverser drive position.

25 Claims, 12 Drawing Sheets

(56) References Cited

U.S. PATENT DOCUMENTS

| | | |
|---|---|---|
| 7,555,882 B2 | 7/2009 | Clauss et al. |
| 8,826,635 B2 | 9/2014 | Schraeder |
| 9,717,179 B2 * | 8/2017 | Trowbridge ........ F16H 61/4139 |
| 9,955,628 B2 | 5/2018 | Gonzalez-Mohino |
| 10,028,437 B2 | 7/2018 | Bomleny et al. |
| 2019/0343045 A1 * | 11/2019 | Matousek ............... A01F 12/46 |
| 2020/0323141 A1 * | 10/2020 | Perez Ramirez .. A01D 41/1274 |
| 2022/0007584 A1 * | 1/2022 | Vergara Martinez ... F16H 61/30 |

* cited by examiner

FEEDERHOUSE GEARBOXES WITH REVERSER WORM DRIVES AND COMBINE HARVESTERS EQUIPPED WITH THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to feederhouse gearboxes containing reverser worm drives, as well as to combine harvesters equipped with such feederhouse gearboxes.

BACKGROUND OF THE DISCLOSURE

Combine harvesters (also referred to as "agricultural combines") have greatly improved the efficiency with which corn, canola, soybeans, wheat, oats, sunflowers, and other crops are harvested, threshed, cleaned, and collected for distribution to consumers. By common design, a combine harvester includes a feederhouse to which different types of harvesting heads or, more simply, "headers" can be attached. A header may have a relatively wide, laterally-elongated form factor to allow the cutting and intake of a broad row of crops as the harvester travels across a field in a forward direction. The header may also include a laterally-extending auger, and other conveyance mechanisms, which intake harvested crops and direct the crops toward an opening in a rear mid-region of the header. The feederhouse receives the harvested crop plants passing through this opening and conveys the crops deeper into the combine harvester for further processing. To provide this function, the feederhouse may also contain a conveyor belt mounted in a tunnel-like feederhouse frame. Additionally, the feederhouse may include a modular gearbox (herein, the "feederhouse gearbox") mounted to a side of the feederhouse frame. The feederhouse gearbox serves as a transmission and a rotational speed reduction, which connects an engine of the combine harvester to the feederhouse conveyor belt and, in many instances, to one or more driven components of the header, such as the above-mentioned auger conveyor. The feederhouse gearbox also usefully provides a so-called "reverser" functionality, which enables the driven components of the feederhouse and the header to be temporarily driven in a reverse direction to help clear any blockages or obstructions in crop flow that may occur during operation of the combine harvester.

SUMMARY OF THE DISCLOSURE

Feederhouse gearboxes are provided for installation on combine harvesters a gearbox housing, an output shaft mounted to the gearbox housing for rotation about an output axis, and a primary drive input. The primary drive input is rotatably mounted to the gearbox housing and mechanically linked to the engine of the combine harvester when the feederhouse gearbox is installed thereon. A reverser drive input is further rotatably mounted to the gearbox housing and mechanically linked to the reverser motor, again as considered when the feederhouse gearbox is installed on the combine harvester. The feederhouse gearbox includes a shifter or selector mechanism within the gearbox housing and movable between a primary drive position and a reverser drive position, a primary gear train transmitting rotation from the primary drive input to the output shaft when the selector mechanism is in the primary drive position, and a reverser worm drive transmitting rotation from the reverser drive input to the output shaft when the selector mechanism is moved into the reverser drive position.

In other embodiments, the feederhouse gearbox includes a gearbox housing, an output shaft mounted to the gearbox housing for rotation about an output axis, and a planetary gear train contained in the gearbox housing. The planetary gear train includes, in turn, a ring gear, a sun gear, and a planet-carrier assembly. The ring gear is coupled to the gearbox housing in a rotationally-fixed relationship. The sun gear is located within the gearbox housing, co-axial with the ring gear, and rotatable about the output axis. Lastly, the planet-carrier assembly is disposed within the gearbox housing, co-axial with the ring gear and the sun gear, and rotatable about the output axis. The feederhouse gearbox further contains a reverser worm drive including a worm and worm gear. The worm gear engages the worm and is likewise rotatable about the output axis. A selector mechanism is disposed within the gearbox housing and controllable to selectively mechanically couple (i) the planet-carrier assembly to the output shaft when the feederhouse gearbox operates in a first modality and (ii) the worm gear to the output shaft when feederhouse gearbox operates in a second modality.

Combine harvesters equipped with feederhouse gearboxes are further disclosed. In various implementations, the combine harvester includes an engine, a reverser motor, and a feederhouse gearbox. The feederhouse gearbox includes a gearbox housing, an output shaft rotatably mounted to the gearbox housing, a primary drive input rotatably mounted to the gearbox housing and mechanically linked to the engine, and a reverser drive input. The reverser drive input is rotatably mounted to the gearbox housing and mechanically linked to the reverser motor. A selector mechanism, further disposed within the gearbox housing, is movable between a primary drive position and a reverser drive position. A primary gear drive or train transmits rotation from the primary drive input to the output shaft when the selector mechanism is in the primary drive position, while a reverser worm drive transmits rotation from the reverser drive input to the output shaft when the selector mechanism is in the reverser drive position.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
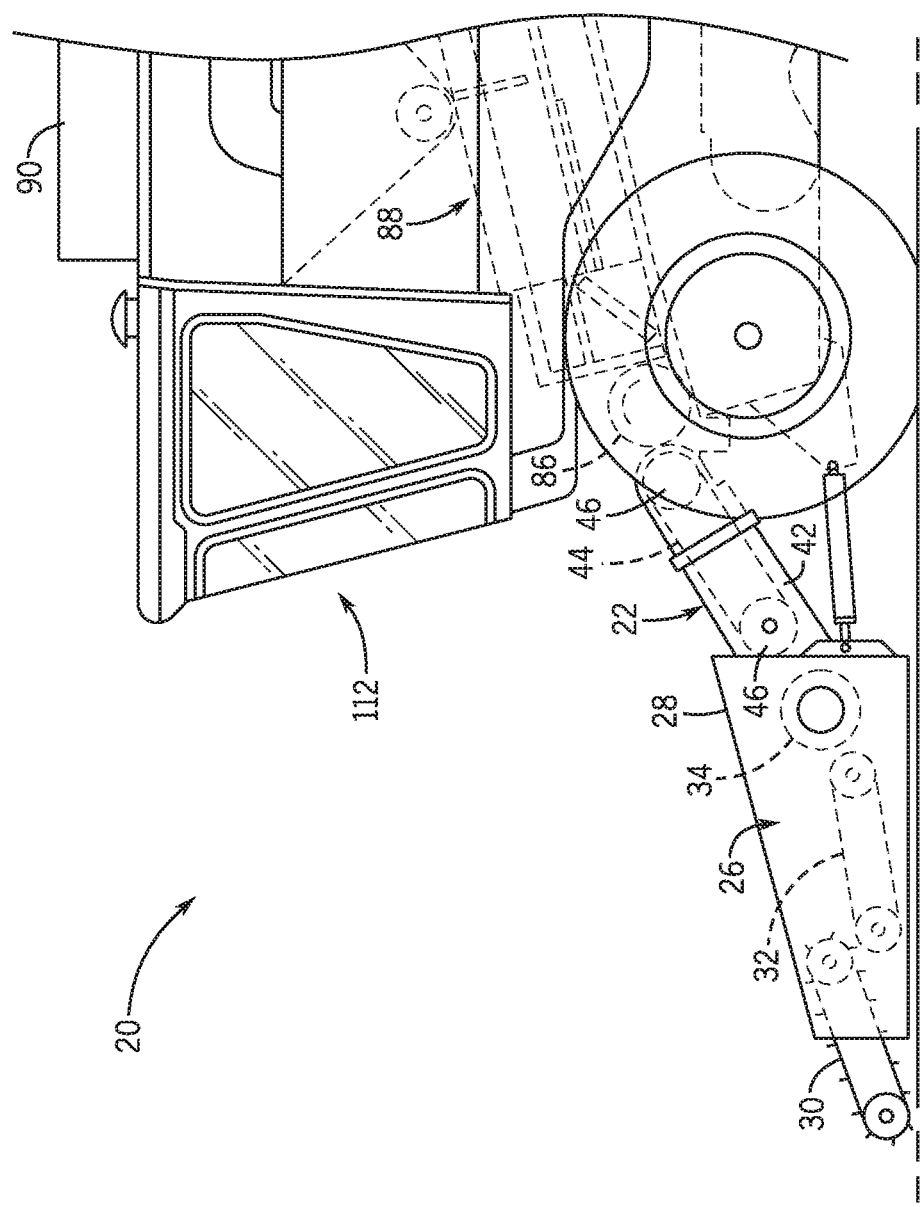
FIG. 1 is a side schematic of a combine harvester including a detachable header, a feederhouse, and a feederhouse gearbox containing a reverser worm drive (shown in FIGS. 2-8, 11, and 12), as illustrated in accordance with an example of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

OVERVIEW

As mentioned above, combine harvester feederhouses are commonly equipped with modular gearboxes capable of operating in both forward and reverser drive modalities. When placed in the reverser drive modality, the feederhouse gearbox facilitates driving of the feederhouse and header in a reverse direction to, for example, help clear blockages interfering with proper crop intake into the harvester. Various feederhouse gearbox designs are conventionally known and commercially available. By way of example, one known feederhouse gearbox design features a dual planetary gear train or system, which is utilized to shift between forward and reverser drive modes in accordance with commands received via operator input controls. Specifically, a selector mechanism located within the gearbox housing may be utilized to alter whether a first rotatable component (e.g., a sun gear) or a second rotatable component (e.g., a ring gear) of the dual planetary system serves as a mechanical output of the system at a given juncture in time. As the sun and ring gears rotate in opposing directions, the rotational direction of the feederhouse gearbox output (e.g., an output shaft) can be varied by positioning of the selector mechanism in response to control commands provided by an operator of the combine. Such a design thus allows the feederhouse gearbox to be freely switched between forward and reverser drive modalities, while a single mechanical input of the feederhouse gearbox is driven in particular rotational direction by the engine of the combine. Further description of a feederhouse gearbox containing such a dual planetary gear train can be found in the following reference: U.S. Pat. No. 6,722,112 B2 entitled "REVERSER CONTROL FOR A COMBINE HARVESTER" and issued by the United States Patent and Trademark Office (USPTO) on Apr. 20, 2004.

Feederhouse gearboxes containing dual planetary gear systems, and other conventional feederhouse gearboxes, are capable of reliable operation over prolonged periods of time, while providing reverser functionalities in the manner previously described. This notwithstanding, conventional feederhouse gearboxes remain limited in certain respects. For example, in the case of many conventional feederhouse gearboxes, mechanical constraints preclude high speed switching between the forward and reverser drive modalities. As a result, it may be necessary to slow, if not wholly arrest rotation of the mechanical input of the feederhouse gearbox when switching from the forward drive mode to the reverser drive mode and vice versa. Significant delay or "dead time" may consequently occur when switching between the forward and reverser drive modes, while the gearbox may be generally incapable of rapid oscillation between forward and reverse driving of the driven components of the feederhouse and header. This may detract from the effectiveness of the feederhouse gearbox in clearing blockages in crop intake when the gearbox operates in the reverser mode, resulting in increased harvester downtime. Conventional feederhouse gearboxes are also limited in other respects, as well. For example, existing feederhouse gearboxes may rely upon relatively complicated electric feedback systems to ensure proper angular alignment between rotating members when switching between the forward and reverser drive modes. Not only does this contribute further delay in mode switching, but such electrical feedback systems introduce additional complexity, part count, and manufacture cost into the gearbox. As a still further drawback, conventional feederhouse gearboxes often provide limited operator control over speed variations when the feederhouse gearbox is placed in the reverser drive mode.

A continued industry demand thus exists for feederhouse gearboxes capable of overcoming the above-described deficiencies, while enabling rapid switching between forward and reverser drive modes. In satisfaction of this demand, the following provides feederhouse gearboxes capable of rapidly switching between forward and reverser drive modes, while having reduced complexity, manufacturing cost, and part count. Additionally, embodiments of the below-described feederhouse may allow enhanced control over the rotational speed of the feederhouse gearbox when operating in the reverser drive modality. Generally, such benefits are achieved through a unique reverser worm drive and primary (e.g., planetary) gear train architecture, as combined with other components (e.g., a rapid-switch indexing ring and associated shifter or selector mechanism) enabling highly efficient switching between forward and reverser drive modes. Further, in various embodiments, a dedicated motor (herein, the "reverser motor") may be utilized to drive the reverser worm drive to allow an operator to rapidly engage the reverser worm drive, while further providing greater speed control in the reverser drive mode. The ability to rapidly transition between speeds and, perhaps, rotational direction in the reverser drive mode may be further enhanced in embodiments in which the reverser motor assumes the form of a hydraulic motor, which may be driven utilizing a proportional control valve scheme. Further, the reverser worm drive may be selected to provide a relatively high mechanical reduction (e.g., a speed reduction exceeding that provided by the the primary gear train) to enable the size of the reverse motor to be minimized, while satisfying torque demands. Still further benefits provided by embodiments of the feederhouse gearbox may include an improved lubrication scheme including, for example, a carrier-driven gerotor further contained within the gearbox housing. The end result is a structurally robust, relatively low part count feederhouse gearbox capable of providing an optimized reverser functionality to increase the effectiveness of the gearbox in assisting with the removal of obstructions or blockages in crop flow as such blockages arise duration combine operation.

Figure 2:
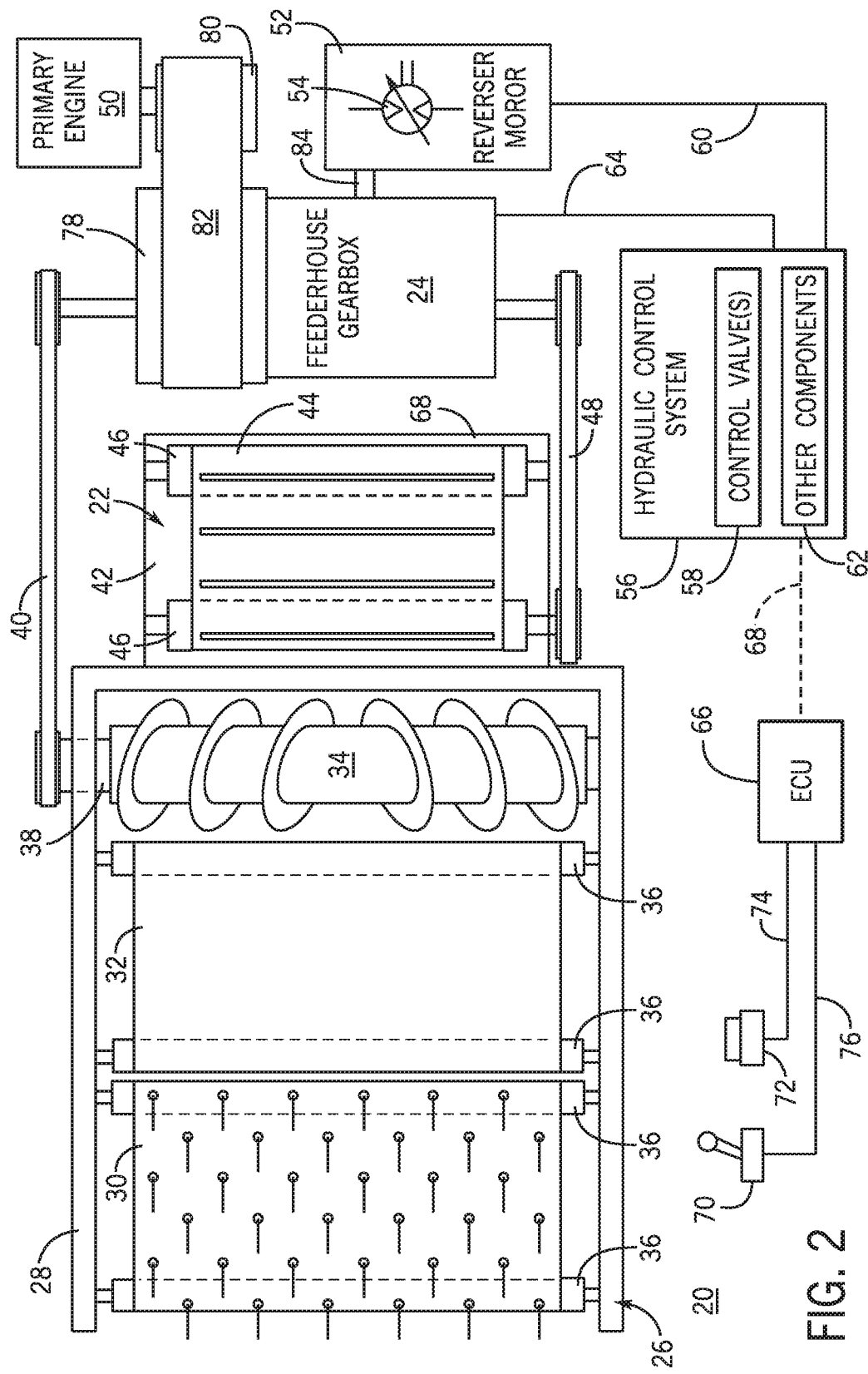
FIG. 2 is a schematic of the header, the feederhouse, the feederhouse gearbox, and various components utilized to support functioning of the feederhouse gearbox, as further included in the example combine harvester shown in FIG. 1.

Additional description of an example feederhouse gearbox containing a reverser worm drive will now be set-forth in connection with FIGS. 1-12. While the example feederhouse gearbox is described in the context of a particular type of combine harvester, as schematically shown in FIGS. 1 and 2, it will be appreciated that embodiments of the feederhouse gearbox can be utilized onboard various other types of combine harvesters, with the below-described combine harvester serving as but one suitable example. Further, the term "combine harvester," as appearing herein, is defined to encompass any agricultural machinery utilized in crop harvesting and including a feederhouse to which a header (or other crop intake device) may be attached, with the feederhouse and/or the header containing at least one component driven through the feederhouse gearbox.

Example Combine Harvester and Reverser Worm Drive-Containing Feederhouse Gearbox FIGS. 1 and 2 schematically depict a forward portion of a combine harvester 20 including feederhouse 22 to which a feederhouse gearbox 24 (FIG. 2) is mounted, as illustrated in accordance with an example embodiment of the present disclosure. An example header 26 is attached to the front end of the feederhouse gearbox 24 for crop intake purposes. The header 26 may be detachable from the feederhouse gearbox 24 and, more generally, from the combine harvester 20 and interchanged with various other types of headers, as desired, to harvest a particular type of crop. The header 26 assumes the form of a belt pickup header in the illustrated example and includes a header chassis or frame 28. A pickup conveyor belt 30, a transfer conveyor belt 32, and an auger conveyor 34 are rotatably mounted to the header frame 28 in series, as taken in a fore-aft direction. As shown in FIG. 2, belts 30, 32 may extend around and be supported by a number of rollers 36, selected ones of which may be driven by one or more non-illustrated motors further mounted to the header frame 28. Comparatively, the auger conveyor 34 may be mounted to an auger shaft 38, which extends between opposing sidewalls of the header frame 28 and which is driven through the feederhouse gearbox 24 during operation of the combine 20. In the illustrated example, the auger shaft 38 is mechanically coupled to the feederhouse gearbox output through a pulley and shaft coupling 40. The particular manner in which the auger conveyor 34 is linked to the mechanical output of the feederhouse gearbox 24 may different in further embodiments.

The feederhouse 22 includes a box-like housing or frame 42, which may be open along longitudinally-opposed ends to form a tunnel through which harvested crop plants pass. A feederhouse conveyor belt 44 is located within the feederhouse frame 42 and supported by a number of rollers 46 (FIG. 2), one or more of which may be driven through the feederhouse gearbox 24. Again, various different mechanical couplings can be utilized to transmit rotation from a mechanical output of the feederhouse gearbox 24 to the driven roller or rollers 46, as determined by the particular design of the feederhouse 22. In the example of FIGS. 1 and 2, specifically, a second pulley and shaft coupling 48 is provided for this purpose and mechanically couples an output of the feederhouse gearbox 24 to a pulley wheel provided around a protruding end of one of the rollers 46. While the auger conveyor 34 of the header 26 and the conveyor belt 44 of the feederhouse 22 are depicted as driven through separate pulley and shafting couplings 40, 48 in the illustrated example, the driven components of the header 26 and the feederhouse 22 may be driven through the same coupling or linkage system in further embodiments of the combine harvester 20. Generally, then, the particular manner in which the driven components contained in the feederhouse 22 and/or the header 26 are mechanically linked to the output or outputs of the feederhouse gearbox 24 is non-essential and may vary between embodiments, as may the type of component or components located in the feederhouse 22 and/or the header 26 that are driven through the gearbox 24.

As just described, certain driven components of the header 26 (e.g., the auger conveyor 34) and the driven components of the feederhouse 22 (e.g., the conveyor belt 44) are mechanically powered through the feederhouse gearbox 24 during operation of the combine harvester 20. The mechanical power input applied to feederhouse gearbox 24 to drive these components can be supplied from different engines or motors onboard the combine harvester 20. For example, and as schematically indicated in FIG. 2, the feederhouse gearbox 24 may include a first mechanical input (herein, the "primary drive input") mechanically linked to a primary engine 50 of the combine harvester 20, such as an internal combustion engine of the harvester. Additionally, the feederhouse gearbox 24 may include a second mechanical input (herein, the "reverser drive input") mechanically linked to a second motor or engine 52 (herein, the "reverser motor 52"), which is separate and distinct from the primary engine 50. Relative to the primary engine 50 of the combine harvester 20, the reverser motor 52 may be a smaller motor of various types, including electrical, pneumatic, and hydraulic motors. In the illustrated embodiment, and as indicated by symbol 54 in FIG. 2, the reverser motor 52 assumes the form of a hydraulic motor and is consequently referred to hereafter as "hydraulic reverser motor 52." The usage of a hydraulic motor for the reverser motor 52 may provide certain benefits, particularly when paired with a proportional valve control scheme enabling rapid speed control of the motor 52 and, therefore, the feederhouse gearbox 24 when operating in the reverser drive mode, as further discussed below.

When assuming the form of a hydraulic motor, the reverser motor 52 may be driven or powered utilizing a hydraulic control system 56 containing at least one proportional control valve 58 regulating the flow of hydraulic fluid to the motor 52. In such embodiments, the proportional control valve or valves 58 are fluidly coupled to the reverser motor 52 via appropriate flow lines, as generically represented in FIG. 2 by line 60. The hydraulic control system 56 may also include various other components 62, including valve actuators, pumps, reservoirs, filters, and the like, as typical of such control systems. Additionally, and as indicated in FIG. 2 by line 64, one or more additional hydraulic flow lines may be present and extend from the hydraulic control system 56 to one or more ports of the feederhouse gearbox 24. Flow line(s) 64 may enable fluidic control of a hydraulic actuator contained within a selector mechanism utilized to shift or switch the gearbox 24 between forward drive and reverser drive modes, as described more fully below in connection with FIGS. 3-12, noting in particular FIGS. 9, 11, and 12. In further implementations, the feederhouse gearbox 24 may be switched between two or more operational modes (the below-described forward and reverse drive modes) utilizing a different type of selector mechanism, whether manual, electrical, hydraulic, and/or pneumatic in nature, in which case flow line(s) 64 may be omitted. Further, various other flow lines may fluidly connect to the feederhouse gearbox 24, such as lubricant conduits, but are not shown in the schematic of FIG. 2 for clarity; examples of such lubricant flow lines are, however, shown and described below in connection with FIGS. 3 and 4.

Operation of the hydraulic control system 56 is controlled via at least one controller, which is placed in signal communication with the hydraulic control system 56 utilizing any suitable mechanical, hydraulic, and/or electrical (wired or wireless) connection architecture. For example, and with continued reference to FIG. 2, operation of the hydraulic control system 56 may be controlled via an engine control unit (ECU) 66 onboard the combine harvester 20; e.g., appropriate control outputs of the ECU 66 may be electrically coupled to the actuator or actuators positioning the control valve(s) 58 within the hydraulic control system 56, as indicated by dashed line 68. ECU 66 may also control various other functions of the primary engine 50 and/or other devices onboard the harvester 20; however, this is ancillary to the present disclosure. During operation, ECU 66 may issue commands to the hydraulic control system 56 to selectively position the selector mechanism within the feederhouse gearbox 24 and to control the reverser motor 52, as further described herein. ECU 66 may issue such commands in response to operator input received via one or more operator input devices 70, 72 coupled to the ECU 66 via signal lines 74, 76, respectively. The operator input devices 70, 72 may be located within the operator cabin or station 51 of the combine harvester 20, as shown in FIG. 1, and manually controlled by an operator piloting the combine harvester 20. The particular form assumed by the operator input device(s) 70, 72 will vary and may include physical and/or virtual (e.g., graphic user interface) forms. In the illustrated example, the operator input devices 70, 72 are generically depicted as including a physical button input 72, which may be utilized to active the reverser drive mode of the feederhouse gearbox 24; and a rotatable joystick or switch 70, which may be utilized to control the speed of the reverser motor 52 when the feederhouse gearbox 24 is placed in the reverser drive mode.

The mechanical output or outputs of the feederhouse gearbox 24 can be selectively driven by either the primary engine 50 or the reverser motor 52, depending upon the particular mode in which the gearbox 24 is placed at a given juncture in time. As noted above, the feederhouse gearbox 24 includes a primary drive input and a reverser drive input, which are mechanically linked to the primary engine 50 and to the reverser motor 52, respectively, in some fashion. In the illustrated embodiment, and by way of non-limiting example only, the primary drive input of the feederhouse gearbox 24 assumes the form of an outer pulley casing 78 rotatably coupled to and disposed about a stationary housing of the gearbox 24, as further described below. When assuming the form of such an outer pulley casing, the primary drive input 78 (alternatively referred to as the "outer pulley casing 78") may be mechanically linked to an output shaft of the primary engine 50 through at least one pulley 80 and belt 82 (FIG. 2). Comparatively, the reverser drive input of the feederhouse gearbox 24 may assume the form of a reverser input shaft 84, which projects at an angle from a side of the housing of the feederhouse gearbox 24. The reverser input shaft 84 is mechanically connected, either directly or indirectly through any number of intervening motion-transmitting components, to a non-illustrated output of the reverser motor 52 when the feederhouse gearbox 24 is installed on the combine harvester 20.

As previously indicated, the feederhouse gearbox 24 is operable in at least two modes of operation, as selected utilizing the operator input devices 70, 72: a default or forward drive mode, and a reverser drive mode. In the forward drive mode, the feederhouse gearbox 24 mechanically couples the combine engine 50 to the mechanical output or outputs of the gearbox 24 and, therefore, to the feederhouse conveyor belt 44 and the driven components (e.g., the transfer auger 34) of the header 26, when present.

Concurrently, the feederhouse gearbox 24 mechanically disconnects the reverser motor 52 from the mechanical output or outputs of the gearbox 24. In this manner, the primary engine 50 may drive the feederhouse conveyor belt 44 and the transfer auger 34 in a forward direction as the combine harvester 20 is navigated over a field by an operator seated in the operator station 51 (FIG. 1). As the combine harvester 20 is piloted in this manner, and referring briefly once again to FIG. 1, crop plants are severed and taken into the mouth or forward opening of the header 26 via the pickup conveyor belt 30. The severed crop plants are then delivered to feederhouse 22 via the transfer conveyor belt 32 and auger 34 within the header 26. Afterwards, the crop plants travel through the tubular frame 42 of the feederhouse 22 by action of the feederhouse conveyor belt 44. Positioned immediately aft of the feederhouse 22, a rotating drum conveyor 86 subsequently delivers the newly-harvested crops into a threshing and separator section 88 for further processing by the harvester 20. The crops plants are threshed, separated, and conveyed through still further sections of the combine harvester 20 for still further processing and cleaning. Grains, or other crop material extracted from the harvested crop plants, are then delivered to a storage (grain) tank 90 for collection and temporary storage.

In the above-described manner, the combine harvester 20 may collect crop plants that are severed and ingested through the header 26 and the feederhouse 22 as the harvester 20 is driven in a forward direction. Occasionally, however, the need may arise to drive the feederhouse 22 and header 26 in a reverse direction to, for example, help clear any blockages that may occur and interrupt crop intake into the harvester 20. Accordingly, when such a need arises, an operator may utilize controls 70, 72 to shift or switch the feederhouse gearbox 24 into the reverser drive mode; although it is not precluded that some degree of automation may be applied when switching the gearbox 24 into the reverser drive mode in other implementations. When switched into the reverser drive mode, the feederhouse gearbox 24 mechanically couples the reverser motor 52 to the mechanical output of the feederhouse gearbox, such as the below-described output shaft 104, while disconnecting the combine engine 50 therefrom; although the combine engine 50 may continue to drive rotation of primary drive input (e.g., the outer pulley casing 78) of the gearbox 24. In one control scheme, the feederhouse gearbox 24 is placed in the reverser drive mode via the transmission of appropriate pressure signals to the feederhouse gearbox 24 conducted through the flow line(s) 64, with the pressure signals then causing a selector mechanism within the feederhouse gearbox 24 to effectuate the desired change in mode. Again, such pressure signals may be controlled by the ECU 66 in response to operator input commands received via the operator input devices 70, 72; e.g., the pressure within the flow line or lines 64 may be altered in a manner causing a hydraulic actuator to select the desired operational mode of the feederhouse gearbox 24.

Notably, the feederhouse gearbox 24 is capable of rapidly switching between the forward and reverser drive modes for reasons described below. Further, when placed in the reverser drive mode, the mechanical output(s) of the feederhouse gearbox 24 are driven by the reverser drive motor 52, which may allow highly responsive and possibly bi-directional speed variations of the mechanical output(s) of the gearbox 24 to optimize the efficiency with which crop blockages are loosened and removed. This may be particularly true when the reverser drive motor 52 assumes the form of a hydraulic motor driven implemented utilizing a proportional control valve system, as generally shown in FIG. 2. Advantageously, imparting the reverser drive motor 52 with such capabilities (e.g., the ability to quickly ramp-up and ramp-down rotational speeds, as well as to reverse rotational directions to allow rapid oscillation) may improve the effectiveness and efficiency with which blockages in crop flow are addressed. This, in turn, may decrease the downtime of the combine harvester 20 and improve overall efficiency of the harvester 20 during usage thereof. This is highly desirable. One manner in which the feederhouse gearbox 24 may rapidly switch between the forward and reverser drive modes of operation, as well as an example internal gearing architecture of the gearbox 24, will now be described more fully below in connection with FIGS. 3-12.

Figure 3:
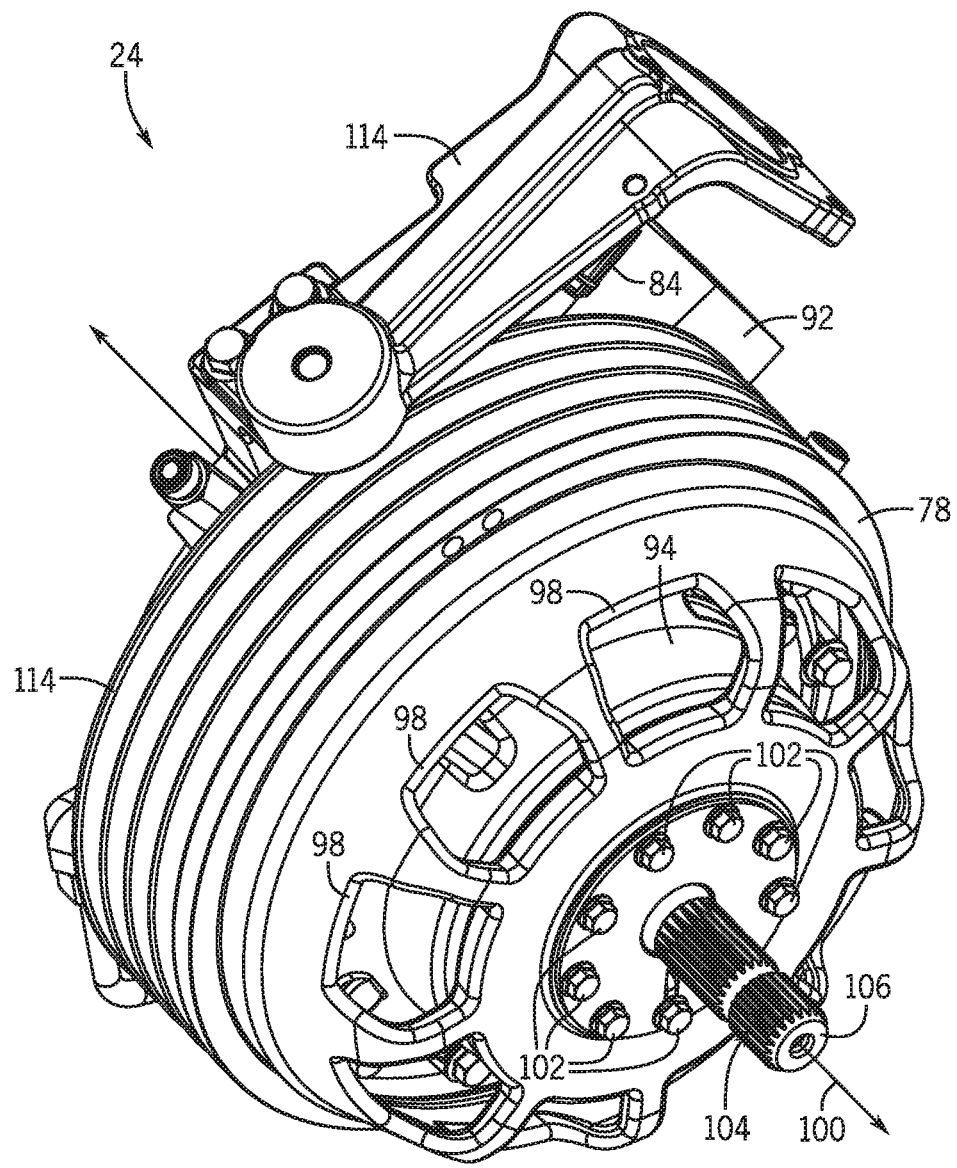
FIGS. 3 and 4 are front and rear isometric views, respectively, of the feederhouse gearbox, as illustrated in accordance with the example embodiment of the present disclosure.
Figure 4:
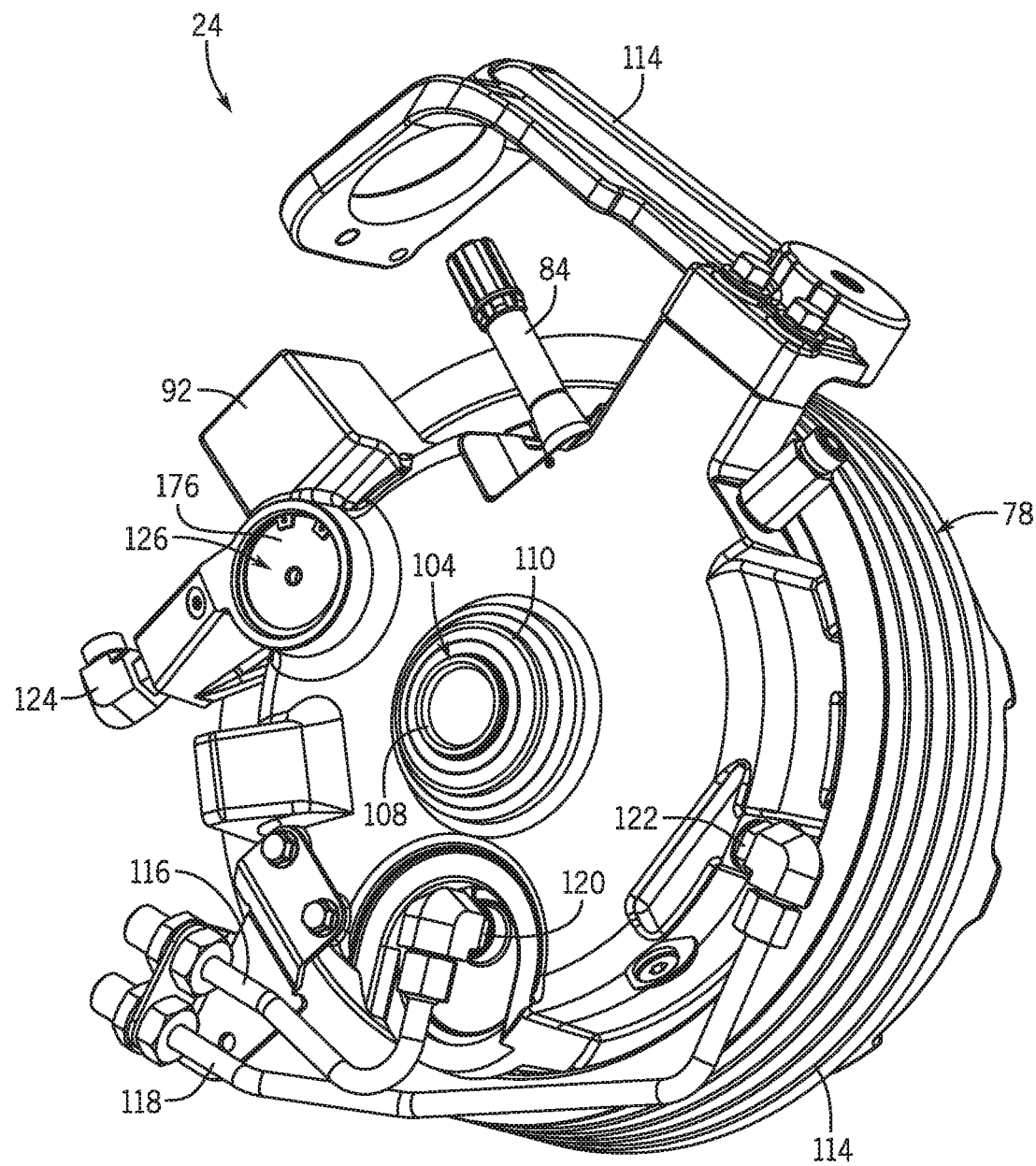

Progressing to FIGS. 3 and 4, an example of the feederhouse gearbox 24 is shown with the following reference numerals carried-over from the previous drawing figures: reference numeral "78" denoting the outer pulley casing 78 serving as the primary mechanical input of the example gearbox 24 in the illustrated embodiment, and reference numeral "84" denoting the input shaft serving as the reverser drive input of the gearbox 24. In addition to these components, the feederhouse gearbox 24 further includes a gearbox housing 92, 94, which contains a reverser worm drive, a primary (e.g., planetary) gear train, a selector mechanism, and various other components, as shown and described in detail below in conjunction with FIGS. 5-12. Noting that the gearbox housing construction will vary among embodiments, in the present example, the gearbox housing 92, 94 is assembled from two primary components or mating pieces: (i) a base housing piece 92, and (ii) a housing cover piece 94. The housing cover piece 94 is nested within the outer pulley casing 78, which extends around or circumscribes the cover piece 94. The cover piece 94 can, however, be seen through a number of windows 98 provided in the pulley casing 78. The outer pulley casing 78 is able to rotate relative to the gearbox housing 92, 94 about an output axis, which is represented by double-headed arrow 100 in FIG. 3. Comparatively, the gearbox housing 92, 94 may be affixed to the feederhouse frame 42 and remain stationary with respect thereto when the feederhouse gearbox 24 is installed on the combine harvester 20 (FIGS. 1 and 2).

When the feederhouse gearbox 24 is installed on the combine harvester 20, a flexible linkage, such as the belt 82 (FIG. 2), is disposed around the outer periphery of the outer pulley casing 78 and utilized to transmit rotation from the primary engine 50 (FIG. 2) to the pulley casing 78. When so driven, the outer pulley casing 78 rotates about the output axis 100 relative to the gearbox housing 92, 94 at a relatively high rate of speed. The feederhouse gearbox 24 serves as a mechanical reduction converting this high speed rotation into lower speed rotation, with higher torque, as better suited for driving the feederhouse conveyor belt 44 (FIGS. 1 and 2) and the driven components of the header 26. In this regard, the rotation of the outer pulley casing 78 may be further transmitted to an inner hub piece 96, which is disposed or nested within the housing cover piece 94 and shown most clearly in FIGS. 11 and 12 (described below). The inner hub piece 96 is rotationally affixed to the outer pulley casing 78 through a number of bolts 102, as shown in FIG. 3. From the rotating inner hub piece 96, rotation is then transmitted to a rotating member included in the primary (planetary) gear train, such as a sun gear as described below.

With continued reference to FIGS. 3 and 4, an output shaft 104 is rotatably mounted to the gearbox housing 92, 94 for rotation about the output axis 100; e.g., the output shaft 104 may be centrally mounted relative to the gearbox housing 92, 94 and have a longitudinal axis co-axial with the output axis 100, as shown. The output shaft 104 can assume various different forms, providing that an exterior mechanical connection can be made to at least one end portion of the output shaft 104. In the illustrated embodiment, the output shaft 104 includes an externally-splined end portion 106, which projects from an opening in the gearbox housing 92, 94 for mechanical connection to the driven components of the feederhouse 22 and/or the header 26. Additionally, and as shown most clearly in FIG. 4, the output shaft 104 may include an internally-splined open end portion 108. The internally-splined shaft end portion 108 may be accessible through an opening in a tubular boss 110 projecting from the base housing piece 92. As the output shaft 104 is a rigid body, the end portions 106, 108 will co-rotate such that the provision of two coupling points is provided for convenience of mechanical attachment, rather than to provide any variance in output speed. Accordingly, in various implementations, one of end of the output shaft 104 may be mechanically linked to the driven feederhouse components (e.g., the feederhouse conveyor belt 44 shown in FIGS. 1 and 2), while the other end of the output shaft is mechanically linked to the driven components of the header 26 (e.g., the auger conveyor 34). In alternative embodiments, both the driven components of the header 26 (if present) and the driven components of the feederhouse 24 may be mechanically linked to the same end portion of the output shaft 104 or, instead, another component serving as the mechanical output of the feederhouse gearbox 24.

A support arm 114 extends from the gearbox housing 92, 94 proximate the reverser input shaft 84. When the feederhouse gearbox 24 is installed on the combine harvester 20, the support arm 114 may support the reverser motor 52 (FIG. 2) and/or components utilized to mechanically connect the output of the reverser motor 52 to an outer (e.g., splined) end of the reverser input shaft 84. A number of other mechanical and/or fluid connections may further be made when the feederhouse gearbox 24 is installed on the combine harvester 20. For example, and as best shown in FIG. 4, these connections may include fluid connections to lubricant ports 120, 122 via corresponding lubricant flow lines 116, 118. In one configuration, the hydraulic port 120 may serve as an inlet port, which draws oil (or another lubricant) into the feederhouse gearbox 24 under the influence of a pump, such as a gerotor contained within the gearbox housing 92, 94; e.g., the gerotor 132 shown in FIGS. 5-8 and described below. In contrast, the hydraulic port 122 may serve as an outlet through which oil is withdrawn from the feederhouse gearbox 24, filtered or otherwise conditioned, and then returned via the inlet port 120. The feederhouse gearbox 24 may still further include hydraulic control port 124, which may receive a pressurized hydraulic fluid to enable control of a hydraulically-actuated selector mechanism 126 further disposed within the feederhouse gearbox 24 (shown in FIGS. 5, 6, 8, and 9, also described below).

Figure 5:
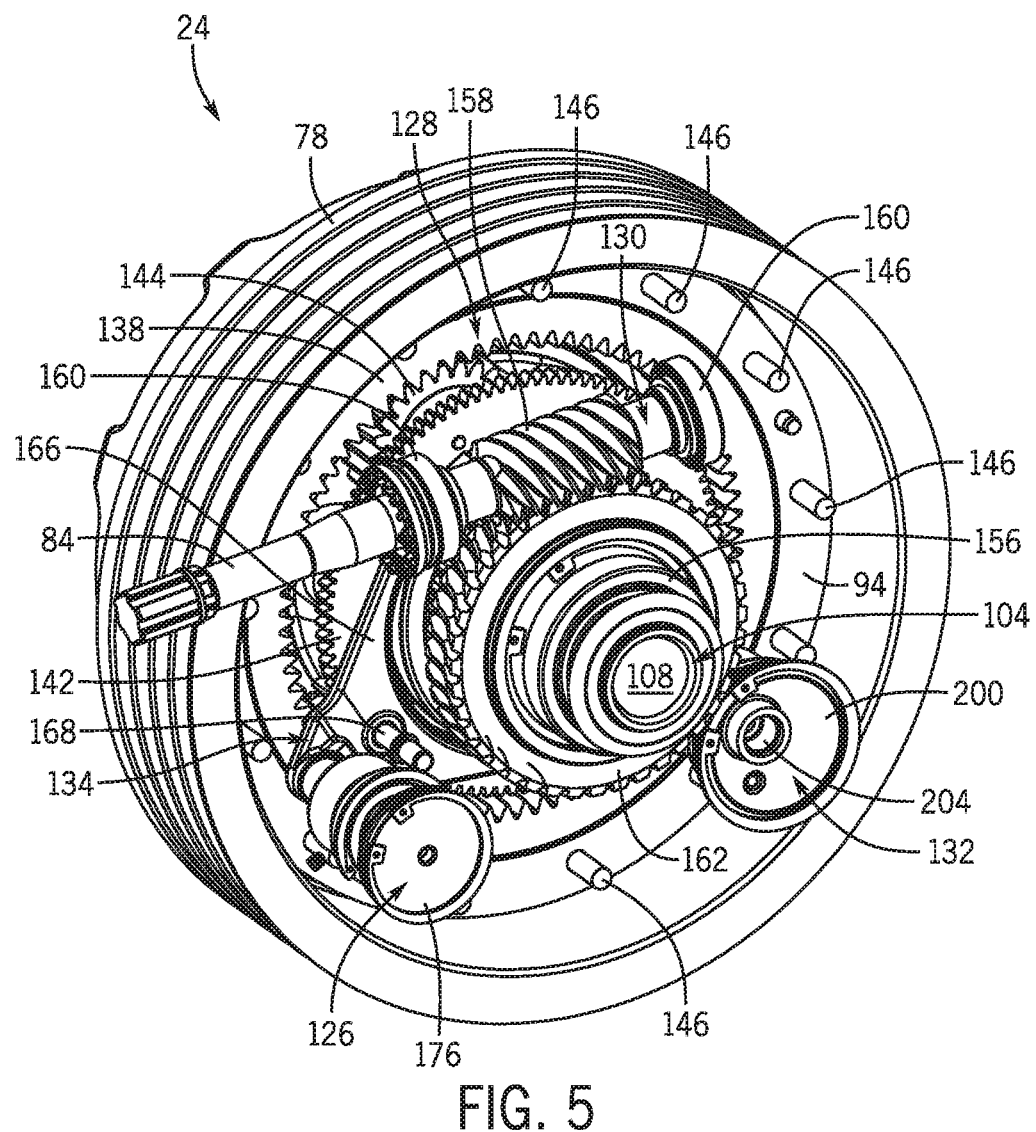
FIGS. 5-7 are isometric views of the example feederhouse gearbox shown in FIGS. 2-4, as depicted at various stages of assembly to reveal the reverser worm drive, the primary (planetary) gear train, a hydraulically-actuated selector mechanism, and other components internal to the gearbox housing.
Figure 6:
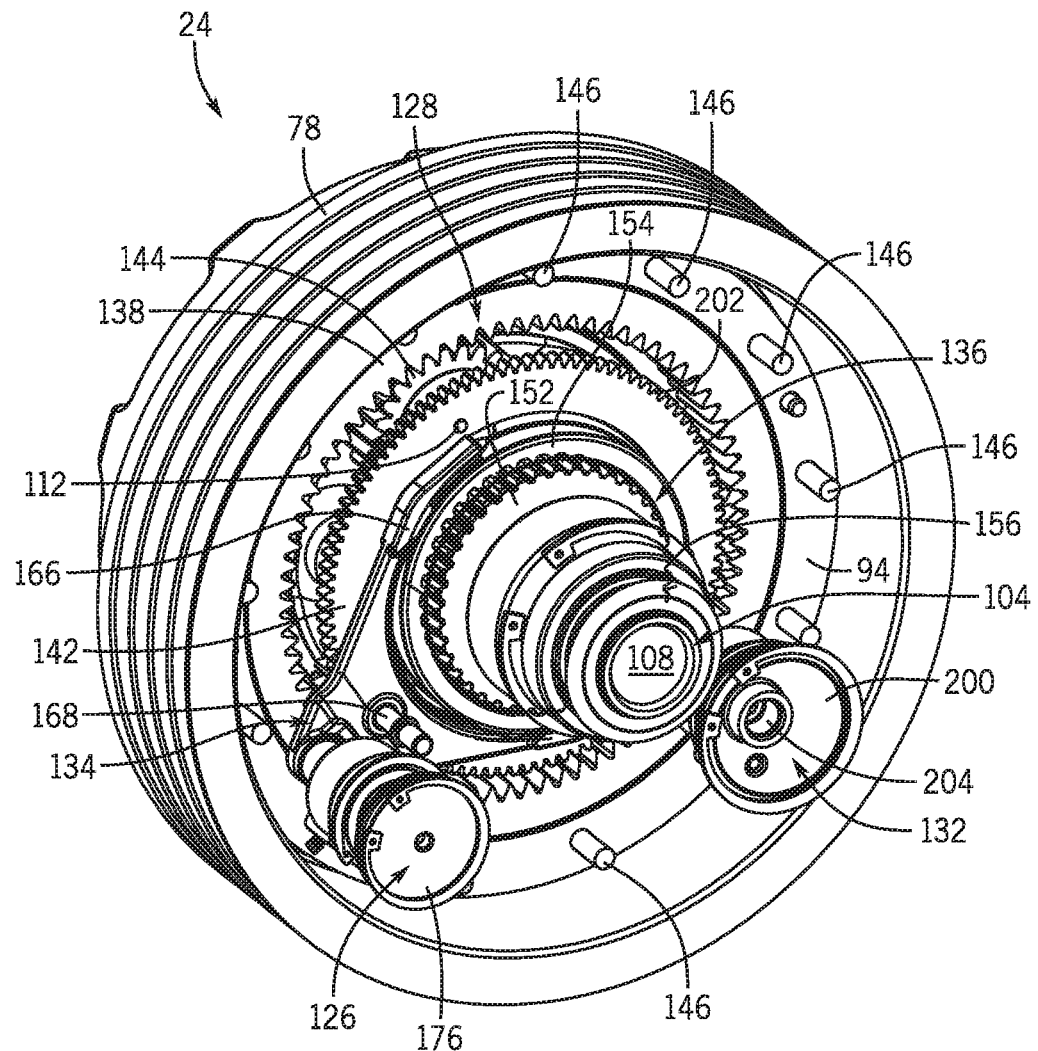
Figure 7:
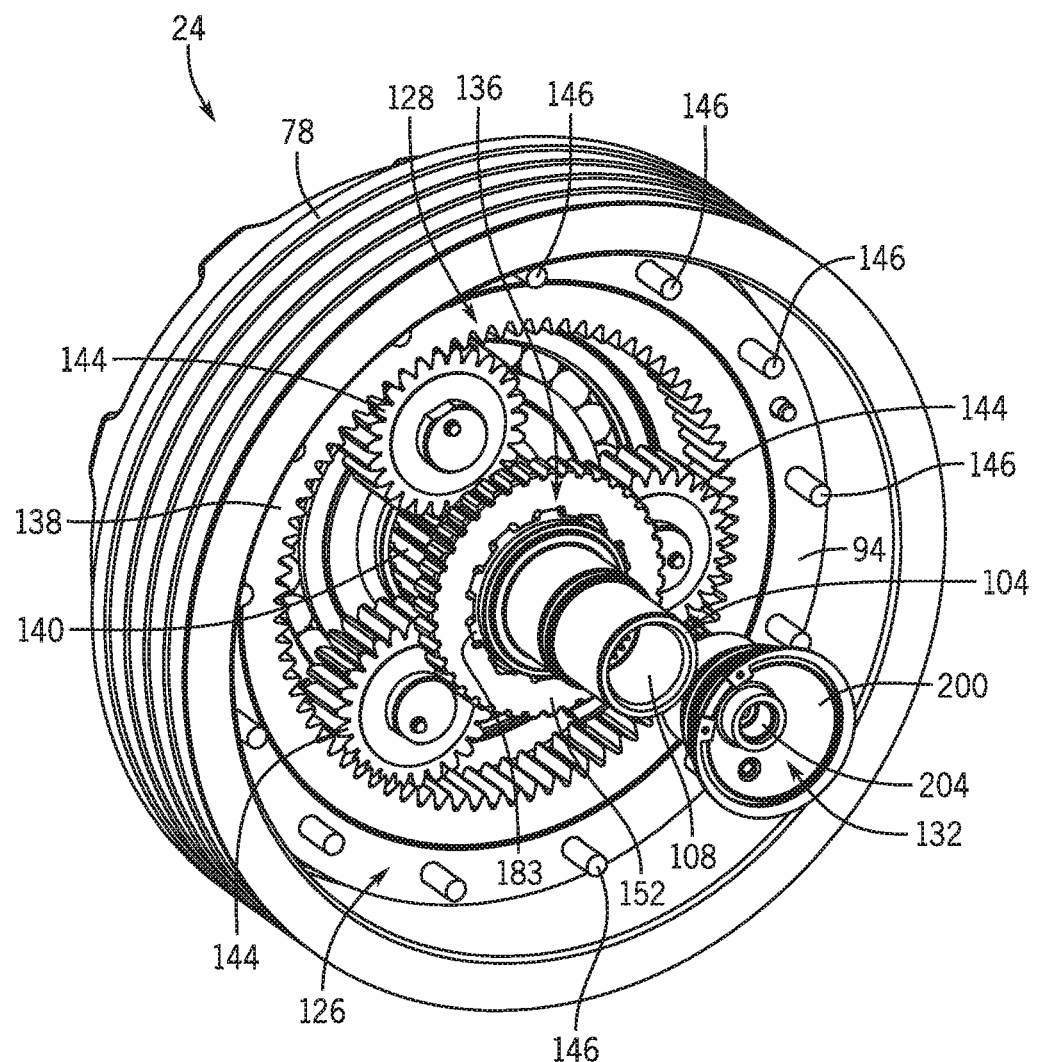
Figure 8:
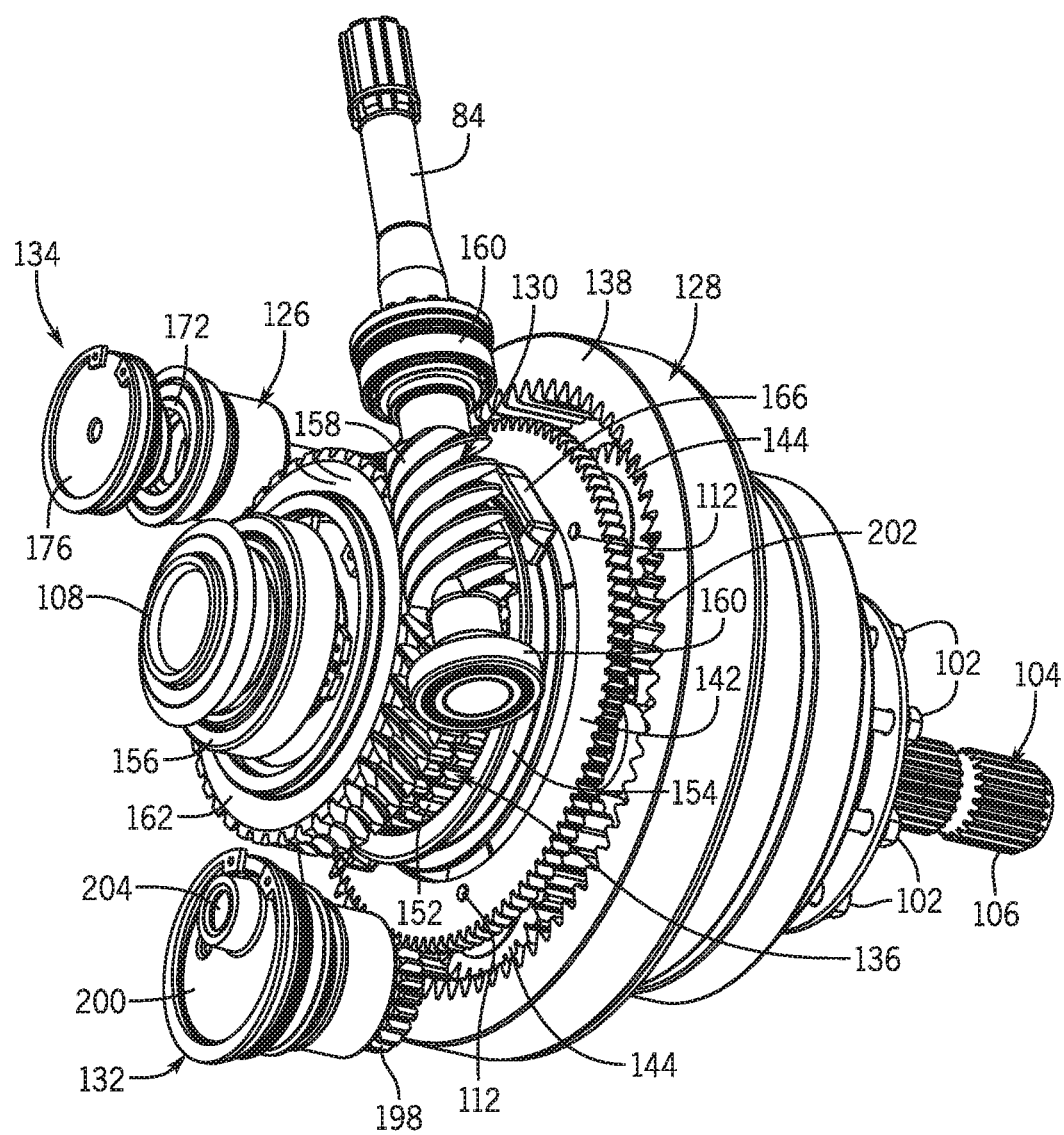
FIG. 8 is an isometric view of the reverser worm drive, the primary (planetary) gear train, the hydraulically-actuated selector mechanism, and a carrier-driven gerotor usefully included in the example feederhouse gearbox.
Figure 9:
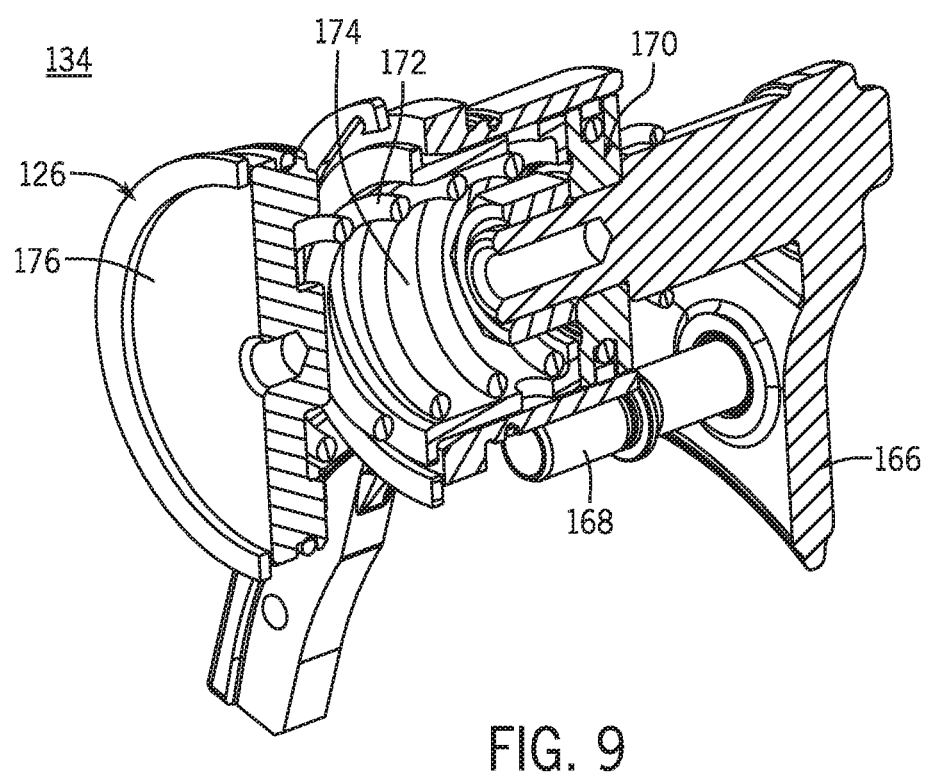
FIG. 9 is an isometric cutaway view of a hydraulic actuator suitably included in the selector mechanism (partially shown) of the feederhouse gearbox, in an embodiment.

Turning next to FIGS. 5-8, the internal components of the example feederhouse gearbox 24 are depicted in various manners, with the feederhouse gearbox 24 shown at different stages of assembly in FIGS. 5-7 and with the gearbox housing 92, 94, the inner rotating hub piece 96, and the outer pulley casing 78 hidden from view in FIG. 8. Generally, the feederhouse gearbox 24 may be described as including at least five internal subsystems or assemblies in the illustrated example: (i) a primary gear train or drive 128; (ii) a reverser worm drive 130; (iii) an internal lubrication pump (here, a gerotor 132); (iv) the previously-mentioned selector mechanism 126 including, among other components, a hydraulic actuator 134; and (v) an indexing ring assembly 136. These subsystems or assemblies contained within the gearbox housing 92, 94 are each described, in turn, below.

Addressing first the primary gear train 128, this gear train assumes the form of a single planetary gear system in the illustrated embodiment and is consequently referred to hereafter as the "primary planetary gear train 128" or, more simply, as the "planetary gear train 128." The illustrated embodiment notwithstanding, the primary gear train 128 need not be realized as a single planetary gear system across all implementations of the feederhouse gearbox 24 and may instead assume various other forms, on the condition that the primary gear train 128 includes at least two meshing gears and provides a mechanical connection between the outer pulley casing 78 and the output shaft 104 of the feederhouse gearbox 24. In one implementation, the primary planetary gear train 128 includes a ring gear 138, a sun gear 140, and a planet-carrier assembly 142, 144. The planet-carrier assembly 142, 144 includes, in turn, a rotatable carrier 142 supporting a number of planet gears 144; e.g., the carrier 142 may support three angularly spaced planet gears 144, which are rotatably mounted to the carrier 142 by pins 112 identified in FIGS. 6 and 8. The planet gears 144 concurrently engage or mesh with the inner toothed periphery of the ring gear 138 and the outer toothed periphery of the sun gear in the typical fashion. Further, the sun gear 140 and the ring gear 138 are disposed in a concentric relationship, with the ring gear 138 circumscribing the sun gear 140. Additionally, the sun gear 140, the ring gear 138, and the planet-carrier assembly 142, 144 are coaxial with the output axis 100 in the present example. The primary planetary gear train 128 is also at least partially nested within the outer pulley casing 78 to impart the feederhouse gearbox 24 with a relatively compact form factor.

The ring gear 138 of the primary planetary gear train 128 is rotationally fixed relative to the gearbox housing 92, 94 and, thus, does not rotate with the sun gear 140 and the planet-carrier assembly 142, 144 when the primary planetary gear train 128 is driven through the outer pulley casing 78 and the rotating inner hub piece 96. Any suitable mechanical coupling or anti-rotation feature may be utilized to prevent the rotation of the ring gear 138 when the primary planetary gear train 128 is driven. For example, the ring gear 138 may be captured between the base housing piece 92 and the housing cover piece 94, with the rotation of ring gear 138 prevented by bolts, alignment pins, or other fasteners 146 (several of which are identified in FIGS. 5-7). In this case, the fasteners 146 may extend through the ring gear 138, the base housing piece 92, and the housing cover piece 94 when the feederhouse gearbox 24 is assembled.

In contrast with the stationary ring gear 138, the sun gear 140 and the planet-carrier assembly 142, 144 rotate about the output axis 100 when the primary planetary gear train 128 is driven through the outer pulley casing 78 and the rotating inner hub piece 96. Rotation of the sun gear 140, the planet-carrier assembly 142, 144, the inner hub piece 96, and the output shaft 104 about the output axis 100 is facilitated by various rolling element (e.g., ball and roller) bearings 156 distributed throughout the feederhouse gearbox 24. Similarly, rotation of the reverser input shaft 84, and the below-described worm 158 included in the reverser worm drive 130, may be facilitated by any number of rolling element bearings. For example, as shown most clearly in FIG. 5, two ball bearings 160 may be fitted around the reverser input shaft 84 adjacent opposing ends of the worm 158.

In addition to worm 158 and ball bearings 160, the reverser worm drive 130 further includes a worm gear 162 positioned in mesh engagement with the worm 158, which is mounted to the reverser input shaft 84 in a rotationally-fixed relationship. The worm gear 162 includes a splined portion 164, which is selectively rotationally coupled to and rotationally-decoupled from the splined intermediate portion 148 of the output shaft 104 via an indexing ring 152 (included in the indexing ring assembly 136) and a splined selector collar 154 (included in the selector mechanism 126). The internally-splined selector collar 154 is engaged by a selector fork 166, which can slide along a translational axis parallel to the output axis 100, as guided by a linear guide pin 168. The selector collar 154 can thus move between: (i) a first position (herein, the "forward drive position") in which the selector collar 154 mechanically couples a first rotatable member included in the primary gear train 128 to the indexing ring 152 (namely, the carrier 142), and (ii) a second position (herein, the "reverser drive position") in which the selector collar 154 mechanically couples a second rotatable member included in the reverser worm drive 130 to the indexing ring 152 (namely, the worm gear 162). Movement of the internally-splined selector collar 154 and selector fork 166 is controlled via the hydraulic actuator 134 in the illustrated example. In alternative embodiments, a different type of hydraulic, electric, or pneumatic actuator may be integrated into the feederhouse gearbox 24, utilized to position the selector collar 154, and thereby select the operational mode of the feederhouse gearbox 24, as desired.

In the present example of the feederhouse gearbox 24, movement of the internally-splined selector collar 154 and selector fork 166 is controlled via the hydraulic actuator 134 forming part of the selector mechanism 126. Describing the actuator 134 in greater detail, and referring also now to FIG. 9, the hydraulic actuator 134 may include a hydraulically-actuated piston 170, at least one mechanical spring 172, a hydraulic chamber 174, and a cap member 176 in one possible construction. The spring 172 is disposed within the hydraulic chamber 174 and seats against the cap member 176. The spring 172 is selected to exert a desired resilient bias force on the hydraulically-actuated piston 170 urging movement of the piston 170 to a position corresponding to the forward drive position of the internally-splined selector collar 154. The hydraulically-actuated piston 170 and the selector collar 154 may thus normally reside in the forward drive position such that the feederhouse gearbox 24 operates in the forward drive mode by default and transitions to the reverser drive mode when the pressure within the hydraulic chamber 174 is varied. In this regard, when the hydraulic pressure within hydraulic chamber 174 is appropriately varied due to changes in the pressure of the hydraulic fluid supplied through the hydraulic control port 124 (FIG. 4), the hydraulic piston 170 slides along a translation axis (parallel to the output axis 100 in the illustrated example) into a position corresponding to the reverse drive position of the selector collar 154; e.g., to the left in the orientation shown in FIG. 9. Again, such variations in pressure may be effectuated by hydraulic control system 56 (FIG. 2), through positioning the valve elements, in response to operator commands received via operator input devices 70, 72.

Figure 10:
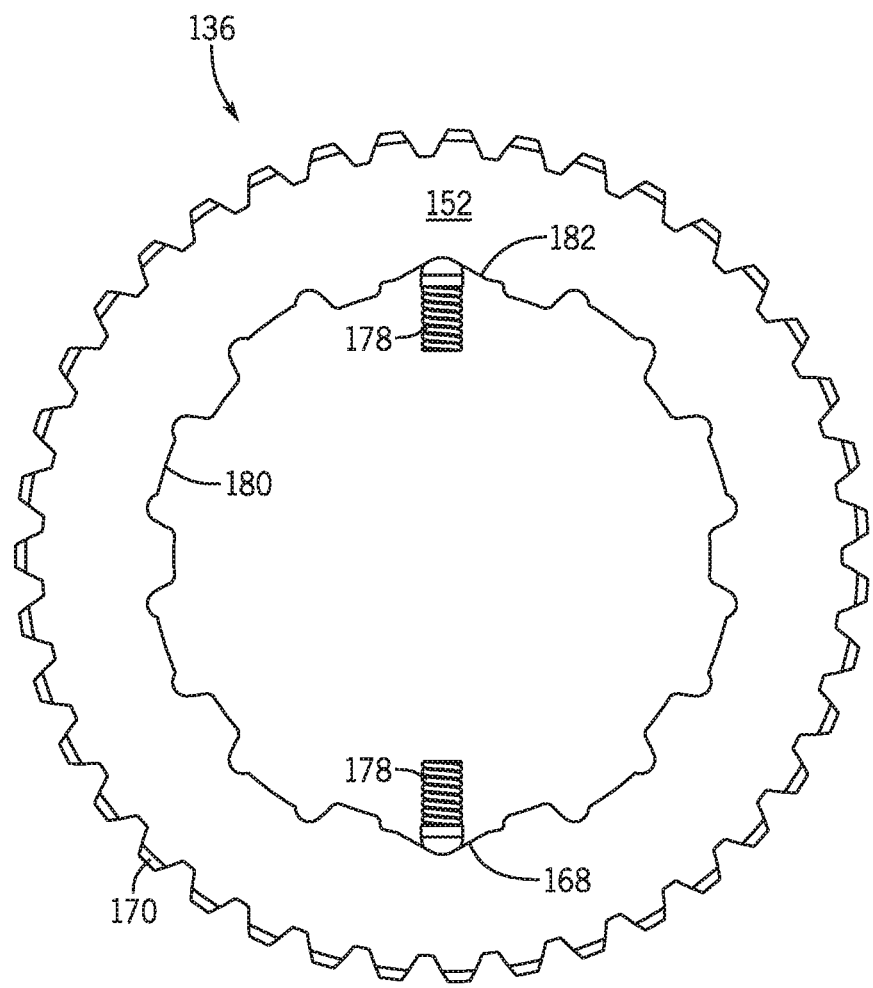
FIG. 10 is a front view of an indexing ring assembly further suitably included in the selector mechanism (partially shown) of the feederhouse gearbox, in an embodiment.

Referring now to FIG. 10 in conjunction with FIGS. 3-9, the example indexing ring assembly 136 includes the previously-mentioned splined indexing ring 152 and a number of spring-biased pins 178. The caps of spring-biased pins 178 are biased against an inner peripheral cam surface 180 of the indexing ring 152. For example, as shown most clearly in FIG. 10, the inner peripheral cam surface 180 of the indexing ring 152 may include valleys 182 into which the heads of the spring-biased pins 178 engage. The opposing ends of the spring-biased pins 178 may be received in the splined output shaft 104. The pins 178 are thus biased to extend into the deepest recess of the valleys 182 to urge the indexing ring 152 to a neutral rotational position relative to the output shaft 104. Concurrently, the splined output shaft 104 includes an outer castellated peripheral portion (identified by reference numeral "183" in FIG. 7), with the castellations or protuberances received within corresponding slots defined by the inner peripheral cam surface 180 of the indexing ring 152. As shown in FIG. 7, the protuberances of the castellated outer peripheral portion 183 of the output shaft 104 are imparted with widths less than that of the slots provided in the inner periphery of the indexing ring 152 to allow rotation of the indexing ring 152 relative to the output shaft 104 over a limited angular range in either rotational direction, after which the protuberances contact with the inner edges of the indexing ring 152 defining the inner peripheral cam surface 180. Co-rotation of the indexing ring 152 and the output shaft 104 in a common rotational direction about the output taxis 100 is thus ensured, while an initial, limited angular movement of the indexing ring 152 relative to the output shaft 104 is permitted to accommodate slight angular misalignments between the ring 152 and the selector collar 154. Such a structural configuration thus aids in rapid switching of the feederhouse gearbox 24 between the forward and reverser drive mode, while negating any need for an electrical feedback system.

Figure 11:
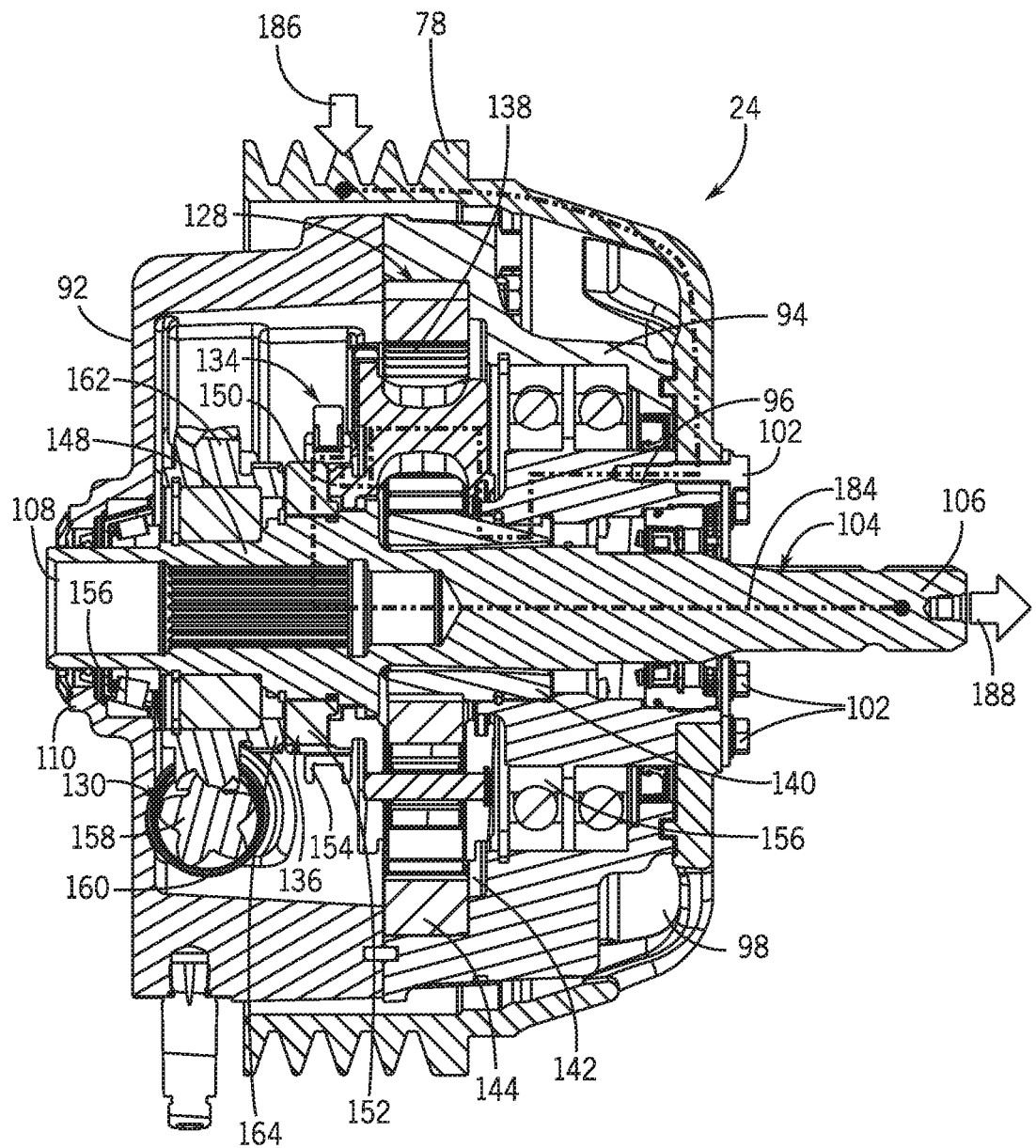
FIGS. 11 and 12 are cross-sectional views of the example feederhouse gearbox depicted in forward and reverser drive mode, respectively, and including dashed lines illustrative of power transfer through the feederhouse gearbox.
Figure 12:
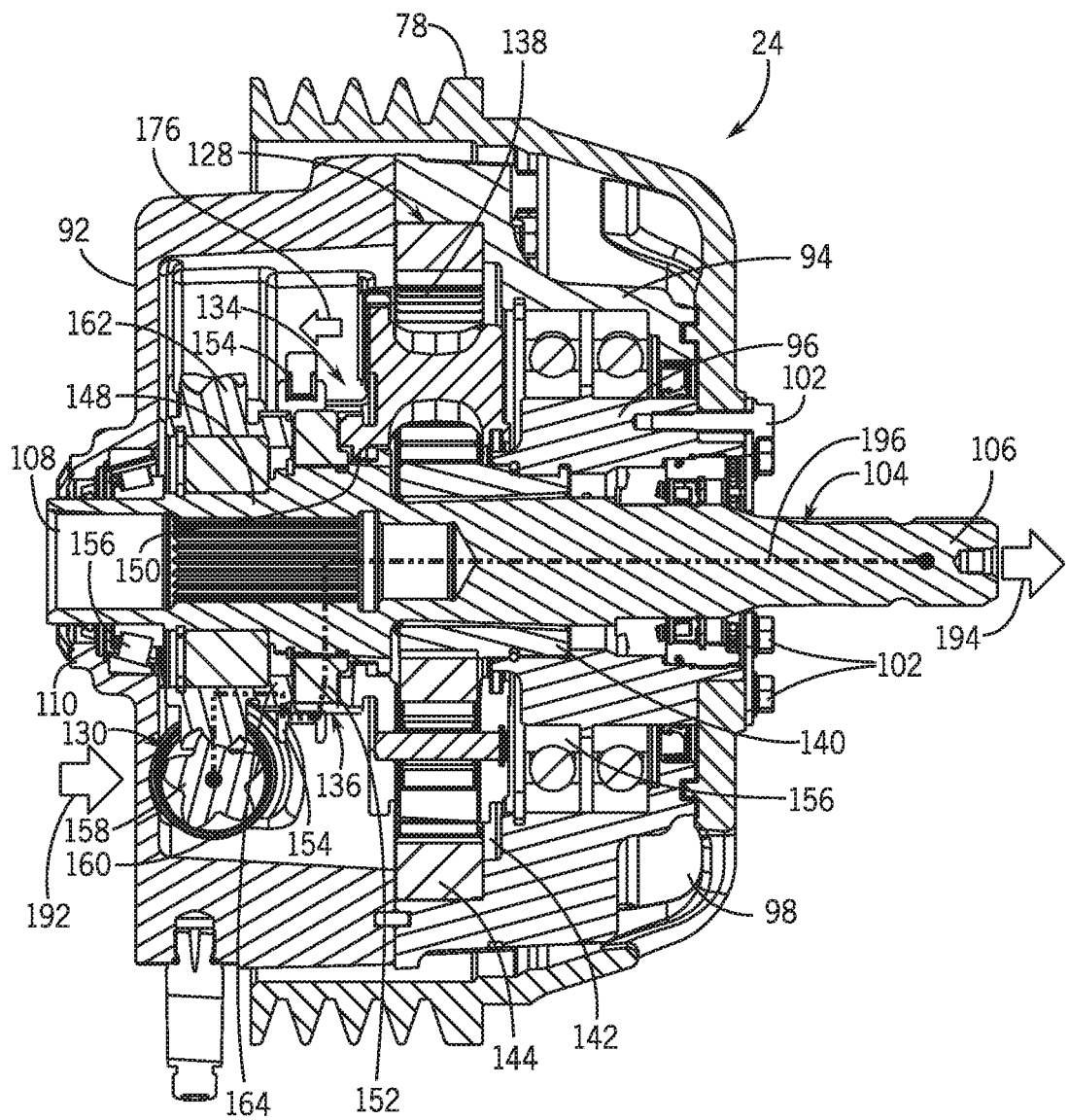

FIGS. 11 and 12 are cross-sectional views of the example feederhouse gearbox 24 is shown in forward drive mode and a reverser drive mode, respectively. Addressing first FIG. 11, the feederhouse gearbox 24 is shown in the forward drive mode, wherein the dashed line 184 represents the power flow transfer through the rotation components of the gearbox 24. Here, the internally-splined selector collar 154 is positioned to mechanically couple the indexing ring 152 to the splined tubular extension 150 projecting from the body of the carrier 142 toward the ring 152. As rotational input is applied to the pulley casing 78 by action of the primary engine 50 of the combine harvester 20 (indicated in FIG. 11 by arrow 186), the inner hub piece 96 rotates along with the pulley casing 78 about the output axis 100. So too does the sun gear 140, which is splined to the inner hub piece 96, co-rotate with the pulley casing 78 and the inner hub piece 96.

Rotation of the sun gear 140 drives rotation of the planet gears 144 and, more generally, the planet-carrier assembly 142, 144, noting again that the outer ring gear 138 is rotationally fixed to the gearbox housing 92, 94 and remains stationary. As the selector collar 154 is currently in the forward drive position (the rightmost position in FIG. 11), rotation of the planet-carrier assembly 142, 144 is transferred via the splined portion 150 of the carrier 142 through the splined selector collar 154, through the indexing ring 152, and to the splined mid-portion 148 of the output shaft 104. The rotational output of the feederhouse gearbox 24 (represented by arrow 188) is thus driven through the primary drive input of the feederhouse gearbox 24 (here, the outer pulley casing 78) when the feederhouse gearbox 24 is placed in the forward drive mode. Generally, then, rotation is transferred from the sun gear 140, through the planet-carrier assembly 142, 144, and to the output shaft 104 when the feederhouse gearbox 24 is installed on the combine harvester 20, the engine 50 drives rotation of the primary drive input of the gearbox 24 (here, the outer pulley casing 78 coupled to the sun gear 140 in a rotationally-fixed relationship), and the selector mechanism 126 is in the primary drive position.

When it is desired to transition the feederhouse gearbox 24 to the reverser drive mode, as indicated by operator commands received via operator input devices 70, 72 (FIG. 2), the pressure within the hydraulic chamber 174 of the hydraulic actuator 134 (FIG. 9) is varied by the hydraulic control system 56 (FIG. 2). As previously described, this pressure variation within the hydraulic chamber 174 causes the hydraulic piston 170, the selector fork 166, and the selector collar 154 to translate into the reverser drive position; that is, to slide to the left in FIGS. 11 and 12, as indicated by arrow 190. In this manner, the selector mechanism 126 (which includes the hydraulic actuator 134 and the selector collar 154) is commanded to move from the primary drive position (FIG. 11) into the reverser drive position (FIG. 12). Substantially concurrently, or following movement of the selector mechanism 126 into the reverser drive position, the hydraulic control system 56 may also command the hydraulic control system 56 to circulate hydraulic fluid through the hydraulic reverser motor 52 to initiate rotation of the reverser input shaft 84 (if not already rotating) and thereby drive the output shaft 104 through the reverser worm drive 130. Specifically, and as represented by arrow 192 in FIG. 12, the reverser motor 52 applies rotational input to the reverser worm drive 130 via the reverser input shaft 84 when the feederhouse gearbox 24 operates in the reverser drive mode.

As further indicated by power flow line 196 in FIG. 12, rotation is transmitted through the worm 158, to the worm gear 162, from the splined portion 164 of the worm gear 162, through the selector collar 154 and the indexing ring 152, and to the output shaft 104. Arrow 194 further represents the rotational output of the feederhouse gearbox 24 when operating in the reverser drive mode and driven by the hydraulic reverser motor 52. Stated more generally, rotation is transferred from the worm 158, through the worm gear 162, and to the output shaft 104 when the feederhouse gearbox 24 is installed on the combine harvester 20, the reverser motor 52 drives rotation of the reverser drive input (here, the reverser input shaft 84), and the selector mechanism 126 is in the reverser drive position. Notably, when the feederhouse gearbox 24 operates in the reverser drive mode, the outer pulley casing 78 may continue to rotate under the influence of the engine 50 of the harvester 20; however, rotation of the outer pulley casing 78, and the corresponding rotation of the inner hub piece 96, sun gear 140, and planet-carrier assembly 142, 144, is not transferred to the output shaft 104 as the shaft 104 is presently rotationally decoupled from the splined tubular extension or portion 150 of the carrier 142 by the selector collar 154 when in the reverser drive position. Stated more succinctly, when in the reverser drive position, the selector mechanism 126 rotationally couples the worm gear 162 to the output shaft 104, while rotationally decoupling the planet-carrier assembly 142, 144 therefrom. Conversely, when in the primary drive position, the selector mechanism 126 rotationally couples the planet-carrier assembly 142, 144 to the output shaft 104, while rotationally decoupling the worm gear 162 therefrom.

In the above-described manner, rapid switching between the forward and reverser drive modes of the feederhouse gearbox 24 is enabled. Moreover, as the reverser worm drive 130 is driven by a dedicated motor (namely, the reverser motor 52 shown in FIG. 2), the direction in which the input of the reverser worm drive 130 rotates can be rapidly changed or oscillated, particularly the reverser motor 52 assumes the form of a hydraulic motor controlled utilizing one or more proportional control valves 58 (FIG. 2). Highly responsive, bi-directional speed control is consequently achieved when the feederhouse gearbox 24 is placed in the reverser drive control to maximize the efficiency with which the gearbox 24 is able to remove blockages interrupting crop flow during operation of the combine harvester 20. An operator of the combine 20 may utilize input device 70 (e.g., a joystick or multi-position switch) to control the speed of the reverser motor 52 and thereby rapidly remove any such blockage in most cases. As a further option, the ECU 66 (FIG. 2) may store one or more preprogrammed clearance routines or schedules in a computer-readable memory. When executed via operator input controls 70, 72, the clearance routine may cause the ECU 66 commands the reverser motor 52 to rapidly ramp up, ramp down, and reverse the speed of the reverser motor 52, as optimized to rapidly clear crop intake blockages. In such embodiments, an operator may select a preprogrammed clearance routine for execution utilizing any suitable physical or virtual interface, such as either of operator input controls 70, 72 shown in FIG. 2. As a more specific, albeit non-limiting example, the ECU 66 may be operable in a rapid blockage removal mode in which the ECU 66 commands the proportional control valve(s) 58 to repeatedly switch or oscillate between driving output shaft of the reverser motor 52 in a first rotational direction and in a second rotational direction, while the selector mechanism 126 resides in the reverser drive position shown in FIG. 12.

In various embodiments, the reverser worm drive 130 is advantageously selected to provide a relatively large mechanical (rotational speed) reduction; e.g., a rotational speed reduction exceeding and, perhaps, at least twice that provided by the primary planetary gear train 128. For example, in one embodiment, the reverser worm drive 130 may be selected to provide a speed reduction equivalent to or exceeding about 8:1 to convert the low torque, high speed input provided by the reverser motor 52 to high torque, low speed output optimized for driving the feederhouse 24 and/or the header 26 (FIGS. 1 and 2) in the reverser drive mode. Comparatively, the rotational speed reduction provided by the primary planetary gear train 128 may be approximately 4:1 in an embodiment. By selecting the reverser worm drive 130 to provide a large rotational speed reduction, the size of the reverser motor 52 may be minimized, particularly when assuming the form of a hydraulic motor. In other embodiments, the reverser worm drive 130 may provide a speed reduction less than or equal to that provided by the primary planetary gear train 128.

Reliable operation of the feederhouse gearbox 24 may be optimized by actively lubricating the interior components of the gearbox 24, particularly the rotating components associated with the primary planetary gear train 128. In this regard, and as previously indicated, embodiments of the feederhouse gearbox 24 further include an internal lubricant pump for drawing lubricant into the gearbox housing 92, 94 in the form of the gerotor 132. By way of example, and referring briefly once again to FIG. 8, the gerotor 132 may include an input gear 198, which projects from a gerotor housing 200 and engages a toothed outer peripheral portion 202 of the carrier 142. A lubricant port 204 may be provided in the gerotor housing 200 for the reception of oil or another liquid lubricant. Such a structural configuration enables the rotor within the gerotor housing 200 to be rotationally driven by the rotation of the carrier 142 and, more generally, the primary planetary gear train 128. Further, in at least some implementations, rotation of the planet-carrier assembly 142, 144 may be driven by the primary engine 50 of the combine harvester 20 regardless of the particular mode in which the feederhouse gearbox 24 is placed in. Thus, in such implementations, the gerotor 132 may likewise remain mechanically linked to and continually driven by the engine 50 to ensure uninterrupted lubricant flow into the gearbox housing 92, 94. Low friction rotation of the rotating components contained in the feederhouse gearbox 24 may thus be promoted to prolong the overall service life of the gearbox 24.

Enumerated Examples of the Feederhouse Gearbox and Combine Harvesters Equipped with the Same The following examples of the feederhouse gearbox and associated combine harvesters are further provided and numbered for ease of reference.

1. A feederhouse gearbox is provided for installation on a combine harvester including an engine and a reverser motor. In an embodiment, the feederhouse gearbox includes a gearbox housing, an output shaft mounted to the gearbox housing for rotation about an output axis, a primary drive input rotatably mounted to the gearbox housing and mechanically linked to the engine when the feederhouse gearbox is installed on the combine harvester, and a reverser drive input rotatably mounted to the gearbox housing and mechanically linked to the reverser motor when the feederhouse gearbox is installed on the combine harvester. A selector mechanism is disposed within the gearbox housing and movable between a primary drive position and a reverser drive position. A primary gear train or drive transmits rotation from the primary drive input to the output shaft when the selector mechanism is in the primary drive position, while a reverser worm drive transmits rotation from the reverser drive input to the output shaft when the selector mechanism is in the reverser drive position.

2. The feederhouse gearbox of example 1, wherein the primary gear train provides a first speed reduction when transmitting rotation from the primary drive input to the output shaft. Additionally, the reverser worm drive provides a second speed reduction when transmitting rotation from the reverser drive input to the output shaft, the second speed reduction greater than the first speed reduction.

3. The feederhouse gearbox of example 1, wherein the primary gear train includes a planet-carrier assembly having planet gears supported by a carrier, the planet-carrier assembly further rotatable relative to the gearbox housing about the output axis.

4. The feederhouse gearbox of example 3, wherein the primary gear train further includes: (i) a sun gear engaging the planet gears and rotatable relative to the gearbox housing about the output axis; and (ii) a ring gear circumscribing the sun gear, engaging the planet gears, and rotationally fixed relative to the gearbox housing.

5. The feederhouse gearbox of example 4, wherein rotation is transferred from the sun gear, through the planet-carrier assembly, and to the output shaft when the feederhouse gearbox is installed on the combine harvester, the engine drives rotation of the primary drive input, and the selector mechanism is in the primary drive position.

6. The feederhouse gearbox of example 4, further including a gerotor within the gearbox housing and mechanically coupled to the planet-carrier assembly. The gerotor urges lubricant flow into the gearbox housing when driven by rotation of the planet-carrier assembly.

7. The feederhouse gearbox of example 4, wherein the primary drive input includes an outer pulley casing coupled to the sun gear in a rotationally-fixed relationship, the primary gear train at least partially nested in the outer pulley casing.

8. The feederhouse gearbox of example 3, wherein the reverser worm drive includes a worm and a worm gear, which is engaged by the worm and which is rotatable about the output axis. Rotation is transferred from the worm, through the worm gear, and to the output shaft when the feederhouse gearbox is installed on the combine harvester, the reverser motor drives rotation of the reverser drive input, and the selector mechanism is in the reverser drive position.

9. The feederhouse gearbox of example 8, wherein the reverser drive input includes a shaft projecting from the gearbox housing and coupled to the worm in a rotationally-fixed relationship.

10. The feederhouse gearbox of example 1, wherein the selector mechanism includes an indexing ring coupled to the output shaft for co-rotation therewith and a selector collar engaging the indexing ring. The selector collar is slidable relative to the indexing ring between: (i) a first position in which the selector collar mechanically couples a first rotatable member included in the primary gear train to the indexing ring; and (ii) a second position in which the selector collar mechanically couples a second rotatable member included in the reverser worm drive to the indexing ring.

11. The feederhouse gearbox of example 10, wherein the first rotatable member and the second rotatable member comprise a carrier and a worm gear, respectively.

12. A feederhouse gearbox for installation on a combine harvester, the feederhouse gearbox including: a gearbox housing, an output shaft mounted to the gearbox housing for rotation about an output axis, and a planetary gear train contained in the gearbox housing. The planetary gear train includes, in turn: a ring gear coupled to the gearbox housing in a rotationally-fixed relationship therewith; a sun gear within the gearbox housing, co-axial with the ring gear, and rotatable about the output axis; and planet-carrier assembly within the gearbox housing, co-axial with the ring gear and the sun gear, and rotatable about the output axis. The feederhouse gearbox further includes a reverser worm drive having a worm contained in the gearbox housing, as well as a worm gear engaged by the worm and rotatable about the output axis. A selector mechanism is controllable to selectively mechanically couple (i) the planet-carrier assembly to the output shaft when the feederhouse gearbox operates in a first modality and (ii) the worm gear to the output shaft when feederhouse gearbox operates in a second modality.

13. The feederhouse gearbox of example 12, further including a gerotor within the gearbox housing and mechanically coupled to the planet-carrier assembly, the gerotor configured driven by rotation of the planet-carrier assembly to urging lubricant flow into the gearbox housing.

14. The feederhouse gearbox of example 12, wherein the reverser worm drive provides a rotational speed reduction at least twice that provided by the planetary gear train.

15. Embodiments of a combine harvester equipped with a feederhouse gearbox are further provided. In an embodiment, the combine harvester includes an engine, a reverser motor, and a feederhouse gearbox. The feederhouse gearbox includes, in turn: an output shaft rotatably mounted to the gearbox housing; a primary drive input rotatably mounted to the gearbox housing and mechanically linked to the engine; a reverser drive input rotatably mounted to the gearbox housing and mechanically linked to the reverser motor; a selector mechanism within the gearbox housing and movable between a primary drive position and a reverser drive position; a primary gear train transmitting rotation from the primary drive input to the output shaft when the selector mechanism is in the primary drive position; and a reverser worm drive transmitting rotation from the reverser drive input to the output shaft when the selector mechanism is in the reverser drive position.

CONCLUSION

There has thus been provided feederhouse gearboxes capable of rapidly switching between forward and reverser drive modes, while having reduced complexity, manufacturing costs, and part count. Embodiments of the feederhouse gearbox include reverser worm drives and other components enabling a dedicated motor (the above-described "reverser motor") to drive rotation of the gearbox output (e.g., a centrally-mounted output shaft) when the feederhouse gearbox operates in the reverser drive mode. Greater operator control of speed variations when the feederhouse gearbox operates in the reverser mode may be achieved as a result, while a relatively large rotational speed reduction may be provided by the reverser worm drive (e.g., a rotational speed reduction exceeding and perhaps at least twice that provided by the primary gear train) to enable the reverser motor size to be minimized. Further, rapid switching between the forward drive and reverser drive modalities may be enabled utilizing a selector mechanism, which allows rapid switching between the modalities without require excessive slowing or rotational arrest of the primary drive input of the feederhouse gearbox, such as the outer pulley casing in the above-described example embodiment. Embodiments of the feederhouse gearbox may also include other unique and useful features, such as a gerotor driven through the carrier of a planetary gear system serving as the primary (e.g., planetary) gear train of the feederhouse gearbox.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A feederhouse gearbox for installation on a combine harvester including an engine and a reverser motor, the feederhouse gearbox comprising:
   a gearbox housing;
   an output shaft mounted to the gearbox housing for rotation about an output axis;
   a primary drive input rotatably mounted to the gearbox housing and mechanically linked to the engine when the feederhouse gearbox is installed on the combine harvester;
   a reverser drive input rotatably mounted to the gearbox housing and mechanically linked to the reverser motor when the feederhouse gearbox is installed on the combine harvester;
   a selector mechanism within the gearbox housing and movable between a primary drive position and a reverser drive position;
   a primary gear train transmitting rotation from the primary drive input to the output shaft when the selector mechanism is in the primary drive position; and
   a reverser worm drive transmitting rotation from the reverser drive input to the output shaft when the selector mechanism is in the reverser drive position.

2. The feederhouse gearbox of claim 1, wherein the primary gear train provides a first speed reduction when transmitting rotation from the primary drive input to the output shaft; and
   wherein the reverser worm drive provides a second speed reduction when transmitting rotation from the reverser drive input to the output shaft, the second speed reduction greater than the first speed reduction.

3. The feederhouse gearbox of claim 1, wherein the primary gear train comprises a planet-carrier assembly including planet gears supported by a carrier, the planet-carrier assembly rotatable relative to the gearbox housing about the output axis.

4. The feederhouse gearbox of claim 3, wherein the primary gear train further comprises:
   a sun gear engaging the planet gears and rotatable relative to the gearbox housing about the output axis; and
   a ring gear circumscribing the sun gear, engaging the planet gears, and rotationally fixed relative to the gearbox housing.

5. The feederhouse gearbox of claim 4, wherein rotation is transferred from the sun gear, through the planet-carrier assembly, and to the output shaft when the feederhouse gearbox is installed on the combine harvester, the engine drives rotation of the primary drive input, and the selector mechanism is in the primary drive position.

6. The feederhouse gearbox of claim 4, further comprising a gerotor within the gearbox housing and mechanically coupled to the planet-carrier assembly, the gerotor urging lubricant flow into the gearbox housing when driven by rotation of the planet-carrier assembly.

7. The feederhouse gearbox of claim 3, wherein the reverser worm drive comprises:
   a worm; and
   a worm gear engaged by the worm and rotatable about the output axis;
   wherein rotation is transferred from the worm, through the worm gear, and to the output shaft when the feederhouse gearbox is installed on the combine harvester, the reverser motor drives rotation of the reverser drive input, and the selector mechanism is in the reverser drive position.

8. The feederhouse gearbox of claim 7, wherein the reverser drive input comprises a shaft projecting from the gearbox housing and coupled to the worm in a rotationally-fixed relationship.

9. The feederhouse gearbox of claim 1, further comprising an indexing ring coupled to the output shaft for co-rotation therewith;
   wherein the selector mechanism further comprises a selector collar engaging the indexing ring and slidable with respect thereto between:
   a first position in which the selector collar mechanically couples a first rotatable member included in the primary gear train to the indexing ring; and
   a second position in which the selector collar mechanically couples a second rotatable member included in the reverser worm drive to the indexing ring.

10. The feederhouse gearbox of claim 9, wherein the first rotatable member and the second rotatable member comprise a carrier and a worm gear, respectively.

11. The feederhouse gearbox of claim 1, wherein the reverser motor comprises a hydraulic motor having a motor output shaft mechanically linked to the reverser worm drive; and
   further comprising:
   a controller; and
   a proportional control valve operably coupled to the controller and hydraulically coupled to the hydraulic motor, the controller operable in a modality in which the controller commands the proportional control valve to repeatedly switch between driving the motor output shaft in a first rotational direction and in a second rotational direction when the selector mechanism is in the reverser drive position.

12. A feederhouse gearbox for installation on a combine harvester including an engine and a reverser motor, the feederhouse gearbox comprising:
   a gearbox housing;
   an output shaft mounted to the gearbox housing for rotation about an output axis;
   a primary drive input rotatably mounted to the gearbox housing and mechanically linked to the engine when the feederhouse gearbox is installed on the combine harvester;
   a reverser drive input rotatably mounted to the gearbox housing and mechanically linked to the reverser motor when the feederhouse gearbox is installed on the combine harvester;
   a primary gear train contained in the gearbox housing, the primary gear train comprising:
   a ring gear coupled to the gearbox housing in a rotationally-fixed relationship therewith;

a sun gear within the gearbox housing, co-axial with the ring gear, and rotatable about the output axis; and a planet-carrier assembly within the gearbox housing, co-axial with the ring gear and the sun gear, and rotatable about the output axis;

a reverser worm drive, comprising:
a worm contained in the gearbox housing; and
a worm gear engaged by the worm and rotatable about the output axis; and a selector mechanism controllable to selectively mechanically couple (i) the planet-carrier assembly to the output shaft when the feederhouse gearbox operates in a first modality and (ii) the worm gear to the output shaft when feederhouse gearbox operates in a second modality.

13. The feederhouse gearbox of claim 12, further comprising a gerotor within the gearbox housing and mechanically coupled to the planet-carrier assembly, the gerotor configured driven by rotation of the planet-carrier assembly to urging lubricant flow into the gearbox housing.

14. The feederhouse gearbox of claim 12, further comprising an indexing ring coupled to the output shaft for co-rotation therewith;
wherein the selector mechanism further comprises a selector collar engaging the indexing ring and slidable with respect thereto between:
a first position in which the selector collar mechanically couples a first rotatable member included in the primary gear train to the indexing ring; and
a second position in which the selector collar mechanically couples a second rotatable member included in the reverser worm drive to the indexing ring.

15. The feederhouse gearbox of claim 12, wherein the planetary gear train provides a first speed reduction when transmitting rotation from the primary drive input to the output shaft; and
wherein the reverser worm drive provides a second speed reduction when transmitting rotation from the reverser drive input to the output shaft, the second speed reduction greater than the first speed reduction.

16. The feederhouse gearbox of claim 12, wherein the reverser motor comprises a hydraulic motor having a motor output shaft mechanically linked to the reverser worm drive; and
further comprising:
a controller; and
a proportional control valve operably coupled to the controller and hydraulically coupled to the hydraulic motor, the controller operable in a modality in which the controller commands the proportional control valve to repeatedly switch between driving the motor output shaft in a first rotational direction and in a second rotational direction when the selector mechanism is in the reverser drive position.

17. A combine harvester, comprising:
an engine;
a reverser motor; and
a feederhouse gearbox comprising:
a gearbox housing;
an output shaft rotatably mounted to the gearbox housing;
a primary drive input rotatably mounted to the gearbox housing and mechanically linked to the engine;
a reverser drive input rotatably mounted to the gearbox housing and mechanically linked to the reverser motor;
a selector mechanism within the gearbox housing and movable between a primary drive position and a reverser drive position;
a primary gear train transmitting rotation from the primary drive input to the output shaft when the selector mechanism is in the primary drive position; and
a reverser worm drive transmitting rotation from the reverser drive input to the output shaft when the selector mechanism is in the reverser drive position.

18. The combine harvester of claim 17, wherein the reverser motor comprises a hydraulic motor having a motor output shaft mechanically linked to the reverser worm drive.

19. The combine harvester of claim 18, further comprising:
a controller; and
a proportional control valve operably coupled to the controller and hydraulically coupled to the hydraulic motor, the controller operable in a modality in which the controller commands the proportional control valve to repeatedly switch between driving the motor output shaft in a first rotational direction and in a second rotational direction when the selector mechanism is in the reverser drive position.

20. The combine harvester of claim 18, wherein the primary gear train comprises:
a planet-carrier assembly including planet gears supported by a carrier, the planet-carrier assembly rotatable relative to the gearbox housing about an output axis;
a sun gear engaging the planet gears and rotatable relative to the gearbox housing about the output axis; and
a ring gear circumscribing the sun gear, engaging the planet gears, and rotationally fixed relative to the gearbox housing.

21. The combine harvester of claim 20, wherein the reverser worm drive comprises:
a worm contained in the gearbox housing; and
a worm gear engaged by the worm and rotatable about the output axis.

22. The combine harvester of claim 21, wherein, when in the primary drive position, the selector mechanism rotationally couples the planet-carrier assembly to the output shaft, while rotationally decoupling the worm gear therefrom; and
wherein, when in the reverser drive position, the selector mechanism rotationally couples the worm gear to the output shaft, while rotationally decoupling the planet-carrier assembly therefrom.

23. The combine harbester of claim 20, further comprising a gerotor within the gearbox housing and mechanically coupled to the planet-carrier assembly, the gerotor urging lubricant flow into the gearbox housing when driven by rotation of the planet-carrier assembly.

24. The combine harvester of claim 17, further comprising an indexing ring coupled to the output shaft for co-rotation therewith;
wherein the selector mechanism further comprises a selector collar engaging the indexing ring and slidable with respect thereto between:
a first position in which the selector collar mechanically couples a first rotatable member included in the primary gear train to the indexing ring; and
a second position in which the selector collar mechanically couples a second rotatable member included in the reverser worm drive to the indexing ring.

25. The combine harvester of claim 17, wherein the primary gear train provides a first speed reduction when transmitting rotation from the primary drive input to the output shaft; and wherein the reverser worm drive provides a second speed reduction when transmitting rotation from the reverser drive input to the output shaft, the second speed reduction greater than the first speed reduction.

\* \* \* \* \*